United States Patent
Terada et al.

(10) Patent No.: US 11,297,333 B2
(45) Date of Patent: *Apr. 5, 2022

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Kengo Terada, Osaka (JP); Takahiro Nishi, Nara (JP); Youji Shibahara, Tokyo (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,751

(22) Filed: Oct. 18, 2019

(65) Prior Publication Data
US 2020/0053366 A1    Feb. 13, 2020

Related U.S. Application Data

(63) Continuation of application No. 15/895,251, filed on Feb. 13, 2018, now Pat. No. 10,491,908, which is a
(Continued)

(51) Int. Cl.
*H04N 19/176* (2014.01)
*H04N 19/70* (2014.01)
(Continued)

(52) U.S. Cl.
CPC .......... *H04N 19/176* (2014.11); *G06T 9/007* (2013.01); *H04N 19/122* (2014.11);
(Continued)

(58) Field of Classification Search
CPC ...... H04N 7/50; H04N 7/30; H04N 19/00072; H04N 19/00278; H04N 19/00084; H04N 19/00315; H04N 19/00884
See application file for complete search history.

(56) References Cited

U.S. PATENT DOCUMENTS 5,189,530 A     2/1993  Fujii
6,360,014 B1    3/2002  Boon
(Continued)

FOREIGN PATENT DOCUMENTS

CN    100579230    1/2010
EP    1 079 634    2/2001
(Continued)

OTHER PUBLICATIONS

Winken et al, Description of video compression technology proposal by Fraunhofer HHI, JCT-VC Apr. 2010 (Year: 2010).*
(Continued)

*Primary Examiner* — Mark Roz
(74) *Attorney, Agent, or Firm* — Wenderoth, Lind & Ponack, L.L.P.

(57) ABSTRACT

An image coding method of coding an image on a per coding unit basis, the method comprising: applying a frequency transform to luminance data and chrominance data of transform units in the coding unit including predetermined blocks each corresponding to one or more of the transform units; and coding the luminance data and the chrominance data to which the frequency transform has been applied to generate a bitstream in which the luminance data and the chrominance data are grouped on a per predetermined block basis.

1 Claim, 36 Drawing Sheets

Related U.S. Application Data continuation of application No. 15/488,891, filed on Apr. 17, 2017, now Pat. No. 9,930,347, which is a continuation of application No. 14/707,200, filed on May 8, 2015, now Pat. No. 9,661,330, which is a continuation of application No. 14/686,838, filed on Apr. 15, 2015, now Pat. No. 9,615,099, which is a continuation of application No. 13/959,897, filed on Aug. 6, 2013, now Pat. No. 9,036,927, which is a continuation of application No. 13/628,143, filed on Sep. 27, 2012, now Pat. No. 9,025,891.

(60) Provisional application No. 61/540,048, filed on Sep. 28, 2011.

(51) Int. Cl.

| | | |
|---|---|---|
| *H04N 19/122* | (2014.01) | |
| *H04N 19/186* | (2014.01) | |
| *G06T 9/00* | (2006.01) | |
| *H04N 19/44* | (2014.01) | |
| *H04N 19/60* | (2014.01) | |
| *H04N 19/136* | (2014.01) | |

(52) U.S. Cl.
CPC ......... *H04N 19/136* (2014.11); *H04N 19/186* (2014.11); *H04N 19/44* (2014.11); *H04N 19/60* (2014.11); *H04N 19/70* (2014.11)

(56) References Cited

U.S. PATENT DOCUMENTS

| | | | |
|---|---|---|---|
| 6,414,991 | B1 | 7/2002 | Yagasaki et al. |
| 6,535,559 | B2 | 3/2003 | Yagasaki et al. |
| 6,643,328 | B2 | 11/2003 | Yagasaki et al. |
| 7,302,002 | B2 | 11/2007 | Yagasaki et al. |
| 7,831,099 | B2 | 11/2010 | Sekino |
| 7,970,217 | B2 | 6/2011 | Hasegawa et al. |
| 9,094,691 | B2 | 7/2015 | Zhang et al. |
| 9,158,539 | B2 | 10/2015 | Raubuch |
| 2002/0114391 | A1 | 8/2002 | Yagasaki et al. |
| 2002/0118750 | A1 | 8/2002 | Yagasaki et al. |
| 2002/0122486 | A1 | 9/2002 | Yagasaki et al. |
| 2003/0133502 | A1 | 7/2003 | Yagasaki et al. |
| 2011/0211636 | A1 | 9/2011 | Yamada et al. |
| 2012/0027084 | A1 | 2/2012 | Zhang et al. |
| 2012/0198212 | A1 | 8/2012 | Raubuch |

FOREIGN PATENT DOCUMENTS

| | | |
|---|---|---|
| EP | 1 947 860 | 7/2008 |
| TW | 201118725 | 6/2011 |
| TW | 201132132 | 9/2011 |
| WO | 2011/019249 | 2/2011 |
| WO | 2011/063824 | 6/2011 |

OTHER PUBLICATIONS

Hearing Notice issued Jan. 15, 2021 in Indian Patent Application No. 15/CHENP/2014.
International Search Report dated Nov. 27, 2012 in International (PCT) Application No. PCT/JP2012/005881.
ISO/IEC 14496-10 (MPEG-4 Part10: Advanced Video Coding), Oct. 1, 2004.
Thomas Wiegand et al., WD3: Working Draft 3 of High-Efficiency Video Coding, Joint Collaborative Team on Video Coding JCT-VC) of ITU-T SG16 WP3 and ISO/IEC JTC1/SC29/WG11, JCTVC-E603_d8, 5th Meeting: Geneva, CH, 2011. 06, pp. 1-10, 45-54, 73-82.
Hiroya Nakamura and Shigeru Fukushima, Coding order of luma and chroma intra prediction modes, Joint Collaborative Team on Video Coding (JCT-VC) of ITU-T SG16 WP3 and ISO/IEC JTC1/SC29/WG11, JCTVC-F094, 6th Meeting: Torino, IT, 2011. 07, pp. 1-21.
Youji Shibahara et al., Nearest placement of Y/Cb/Cr transform coefficients locating at same spatial position, Joint Collaborative Team on Video Coding (JCT-VC) of ITU-T SG16 WP3 and ISO/IEC JTC1/SC29/WG11, JCTVC-G381_v4, 7th Meeting: Geneva, CH, 2011. 11, pp. 1-15.
Tim Hellman and Yong Yu, Changing Luma/Chroma Coefficient Interleaving from CU to TU level, Joint Collaborative Team on Video Coding (JCT-VC) of ITU-T SG16 WP3 and ISO/IEC JTC1/SC29/WG11, JCTVC-G112, 7th Meeting: Geneva, CH, 2011. 11, pp. 1-10.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, Ver. 2, 6th Meeting: Torino, IT, Jul. 14-22, 2011.
Written Opinion of the International Searching Authority dated Nov. 27, 2012 in International (PCT) Application No. PCT/JP2012/005881 (with English translation).
Office Action dated Dec. 6, 2013 in U.S. Appl. No. 13/628,143.
Iain E. G. Richardson, H.264 and MPEG-4 Video Compression, Video Coding for the Next-generation Multimedia, John Wiley & Sons, 2003.
Extended European Search Report dated Feb. 3, 2015 in European Application No. 12836512.9.
Ken McCann et al., "HM3: High Efficiency Video Coding (HEVC) Test Model 3 Encoder Description", Joint Collaborative Team on Video Coding (JCT-VC) of ITU-T SG16 WP3 and ISO/IEC JTC1/SC29/WG11, JCTVC-E602, 5$^{th}$ Meeting: Geneva, CH, Mar. 16-23, 2011.
Youji Shibahara et al., "Nearest placement of Y/Cb/Cr transform coefficients locating at same spatial position", Joint Collaborative Team on Video Coding (JCT-VC) of ITU-T SG16 WP3 and ISO/IEC JTC1/SC29/WG11, JCTVC-G381, 7$^{th}$ Meeting: Geneva, CH, Nov. 21-30, 2011.
Winken et al., Description of video compression technology proposal by Fraunhofer HHI, JCT-VC Apr. 2010.
Office Action and Search Report dated Nov. 26, 2015 in Taiwanese Application No. 101135303, with partial English translation.
Office Action dated Apr. 4, 2016 in European Application No. 12836512.9.
Wiegand et al., "BoG report: residual quadtree structure", Joint Collaborative Team on Video Coding (JCT-VC) of ITU-T SG16 WP3 and ISO/IEC JTC1/SC29/WG11, JCTVC-C319, WG11 No. m18590, 3rd Meeting: Guangzhou, CN, Oct. 7-15, 2010, XP030008027.
Office Action dated Jan. 22, 2019 in Indian Patent Application No. 15/CHENP/2014.
Benjamin Bross et al., "WD4: Working Draft 4 of High-Efficiency Video Coding", JCT-VC of ITU-T and ISO/IEC. JCTVC-F803, Ver.3, Sep. 8, 2011, pp. 1-222.

* cited by examiner

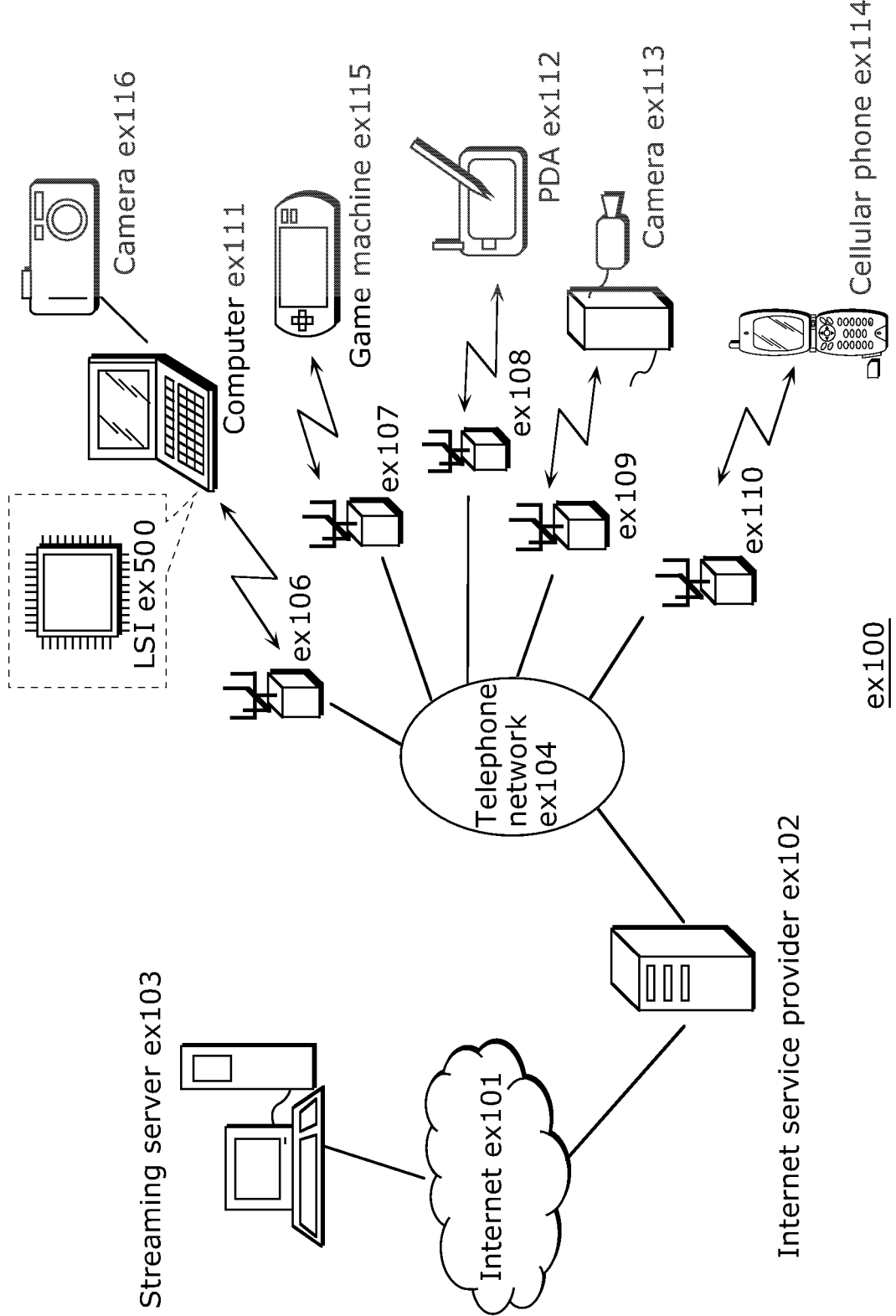

FIG. 26
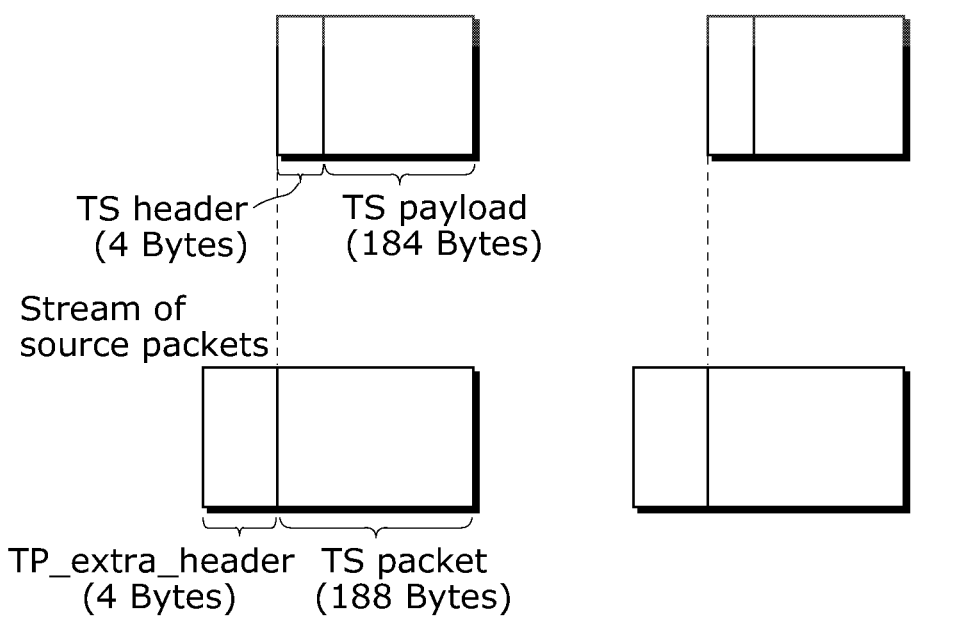
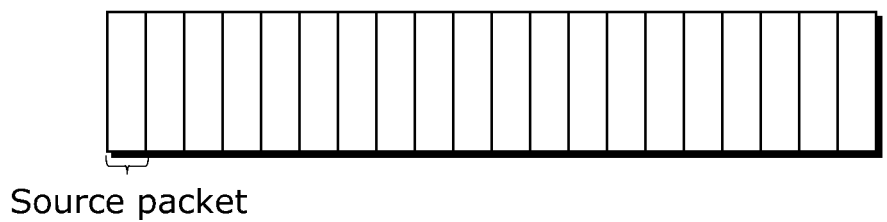

FIG. 34

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

FIELD

The present disclosure relates to image coding methods of coding an image on a per block basis and image decoding methods of decoding an image on a per block basis.

BACKGROUND

Non-Patent Literature (NPL) 1 discloses a technique relating to an image coding method of coding an image (including a moving picture) on a per block basis and an image decoding method of decoding an image on a per block basis.

CITATION LIST

Non Patent Literature

[NPL 1] ISO/IEC 14496-10 "MPEG-4 Part10 Advanced Video Coding"

SUMMARY

Technical Problem

However, some conventional image coding methods and image decoding methods include inefficient processes.

Thus, one non-limiting and exemplary embodiments herein provides an image coding method of efficiently coding an image, and an image decoding method of efficiently decoding an image.

Solution to Problem

The image coding method of coding an image on a per coding unit basis according to one embodiment of the present disclosure includes: applying a frequency transform to luminance data and chrominance data of transform units in the coding unit including predetermined blocks each corresponding to one or more of the transform units; and coding the luminance data and the chrominance data to which the frequency transform has been applied to generate a bitstream in which the luminance data and the chrominance data are grouped on a per predetermined block basis.

These general and specific aspects may be implemented using a system, an apparatus, an integrated circuit, a computer program, or a non-transitory computer-readable recording medium such as a CD-ROM, or any combination of systems, apparatuses, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The image coding method and the image decoding method according to one or more exemplary embodiments or features disclosed herein provide a method of efficiently coding or decoding an image.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 17 An overall configuration of a content providing system for implementing content distribution services.

FIG. 26 A structure of TS packets and source packets in the multiplexed data.

FIG. 34 An example of a look-up table in which video data standards are associated with driving frequencies.

DESCRIPTION OF EMBODIMENTS (Underlying Knowledge Forming Basis of the Present Disclosure)

In relation to the technique relating to an image coding apparatus for coding an image on a per block basis and an image decoding apparatus for decoding an image on a per block basis disclosed in the Background section, the inventors have found the following problem:

Recent years have seen rapid advancement in digital video equipment technology. The ability to compress a video signal (a plurality of pictures arranged in a time series) input from a video camera or a television tuner and store the compressed signal on a recordable medium such as a DVD or hard disk has become commonplace.

When a video signal is coded, image data is generally demultiplexed into luminance information (Y), first chrominance information (U), and second chrominance information (V). A frequency transform is applied to each of these, and the coefficient value obtained as a result is coded using a coding technique such as variable length coding or arithmetic coding.

Even more specifically, a single image is partitioned into coding units (hereinafter referred to as CU), a CU is further partitioned into transform units (hereinafter referred to as TU), then a frequency transform is applied to each of the Y, U, and V in a TU. A bitstream is then generated by combining the Y, U, and V coding results. Moreover, in the decoding, the coefficient value of each of the Y, U, and V is decoded from the bitstream, and image information for each of the Y, U, and V is obtained from the coefficient values by inverse transformation.

It is to be noted that a CU is a unit of data for coding an image which corresponds to a macroblock according to the video coding standards H.264/AVC and MPEG-4 AVC (see NPL 1). The CU is included in a picture or in a slice within a picture. A largest coding unit (hereinafter referred to as LCU) is a square of a predetermined fixed size. The CU is a square smaller than the predetermined fixed size. Two CUs in the same picture or in the same slice may be squares of different sizes.

For example, each of the four blocks defined by partitioning a square of a predetermined fixed size in a picture or slice into four parts may be designated as the CU. Moreover, among a plurality of hierarchical blocks defined by partitioning a square of a predetermined fixed size into four parts in multiple stages, the lowest hierarchical block may be designated as the CU. When a square of a predetermined fixed size is not partitioned into four parts, the LCU may be designated as the CU. An image is coded on a per CU basis and a bitstream is generated in accordance with the above described designations.

Figure 1:
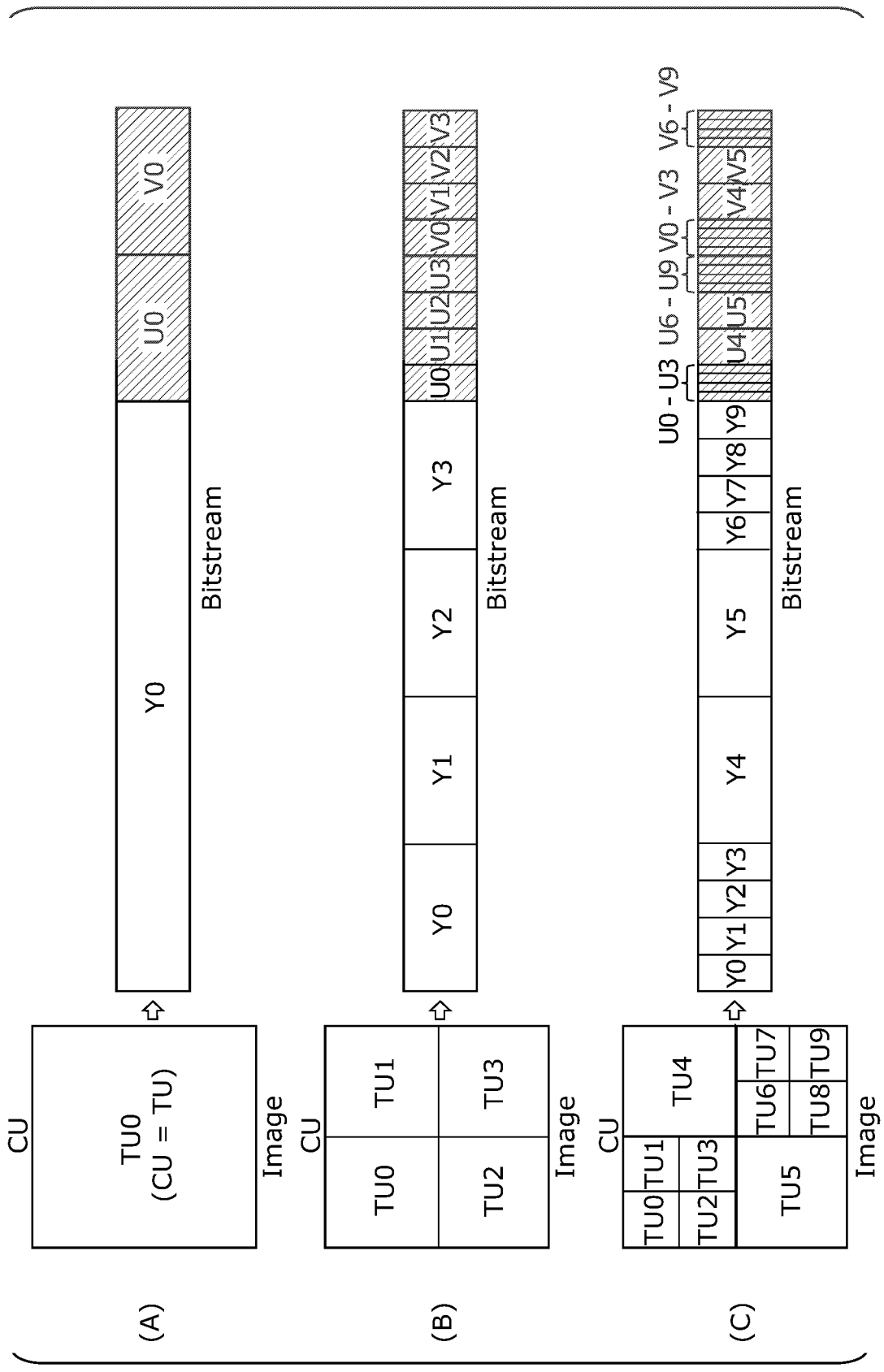
FIG. 1 illustrates a conventional bitstream.

In the conventional example shown in FIG. 1, for each CU, each of the Y, U, and V are arranged in sequence and a bitstream is generated. In FIG. 1, Yn is Y information for TUn, Un is U information for TUn, and Vn is V information for TUn. Moreover, FIG. 1 is an example of a 4:2:0 format, meaning the number of pixels in U and V are one-forth that of Y.

However, in the conventional bitstream structure, since the U and V bitstreams cannot be outputted until every Y in the CU is coded and outputted in a bitstream, even if the situation allowed for a bitstream of U or V to be outputted ahead of a portion of Y in the CU, it would not be possible to do so. In other words, buffering is required. Using (C) in FIG. 1 to explain, the bitstream for U0 cannot be outputted until the bitstream for Y9 is outputted, requiring the information on U0 to be placed in the buffer memory or register. For this reason, a problem arises in which a larger buffer memory or register is required.

Moreover, in decoding as well, while video cannot be outputted until Y, U, and V are decoded, U and V cannot be decoded until every Y in the CU is decoded. This means that buffering the Y decoding result is necessary. Using (C) in FIG. 1 to explain, the T0 block cannot be outputted to video until V0 is decoded, requiring Y0 to Y9 and U0 to U9 to be placed in the buffer memory or register.

In order to solve the above described problem, the image coding method of coding an image on a per coding unit basis according to one embodiment of the present disclosure includes: applying a frequency transform to luminance data and chrominance data of transform units in the coding unit including predetermined blocks each corresponding to one or more of the transform units; and coding the luminance data and the chrominance data to which the frequency transform has been applied to generate a bitstream in which the luminance data and the chrominance data are grouped on a per predetermined block basis.

With this, U and V bitstreams can be outputted even before the bitstreams for every Y in the CU have been outputted, thereby eliminating the need to buffer U and V and allowing for a reduced buffer memory or register.

For example, each of the predetermined blocks may correspond to transform units in a block of a predetermined size, or to a transform unit of a size greater than or equal to the predetermined size, and in the coding, the luminance data and the chrominance data may be coded to generate the bitstream in which the luminance data and the chrominance data are grouped on a per predetermined block basis.

With this, the Y, U, and V are arranged in a bitstream on a per appropriate data unit basis, resulting in increased processing efficiency.

Moreover, for example, in the applying: the frequency transform may be applied to the luminance data on a per transform unit basis; when a total number of pixels of the chrominance data and a total number of pixels of the luminance data are equal, the frequency transform may be applied to the chrominance data on a per transform unit basis; and when the total number of pixels of the chrominance data is less than the total number of pixels of the luminance data, the frequency transform may be applied to the chrominance data on a per predetermined block basis.

With this, a frequency transform is applied on a per data unit basis to the Y, U, and V, the data unit being a data unit appropriate for the number of pixels. As a result, processing efficiency increases.

Moreover, for example, in the applying, from among the chrominance data of the transform units in the coding unit, chrominance data of transform units in a block of a size that is smaller than or equal to the predetermined size may be combined, and the frequency transform may be applied to the combined chrominance data in one frequency transform.

With this, the data unit for transformation can be kept from becoming too small. As a result, it is not necessary to provide a small transform circuit. Moreover, in contrast to a case in which Y had to be made larger than the smallest TU size in an effort to keep U or V from being smaller than the smallest TU, with this configuration, Y can be made to be the smallest TU size, resulting in increased coding efficiency.

Moreover, for example, in the applying, when a size of one of the transform units is a predetermined smallest size and in the transform unit a total number of pixels of chrominance data is less than a total number of pixels of luminance data, from among the chrominance data of the transform units in the coding unit, chrominance data of transform units in a block including the transform unit may be combined, and the frequency transform may be applied to the combined chrominance data in one frequency transform.

With this, even when the TU size is the smallest TU size and the number of pixels in U or V is less than the number of pixels in Y, as is the case in a 4:2:0 or 4:2:2 format, neither U nor V are smaller than the smallest TU size. As a result, it is not necessary to provide a transform circuit that is smaller than the smallest TU. Moreover, in contrast to a case in which Y had to be made larger than the smallest TU size in an effort to keep U or V from being smaller than the smallest TU, with this configuration, Y can be made to be the smallest TU size, resulting in increased coding efficiency.

Moreover, for example, in the coding, luminance data and chrominance data of transform units in one of the predetermined blocks may be coded to generate the bitstream in which, in the predetermined block, the chrominance data of all the transform units follows the luminance data of all the transform units.

With this, U and V follow Y, and this sequence is maintained. As a result, it is not necessary to take into consideration switching this sequence. Consequently, it is possible to reduce the complexity of the image processing.

Moreover, for example, each of the predetermined blocks may correspond to transform units in a block of a predetermined size, or to a transform unit of a size greater than or equal to the predetermined size, in the applying, the frequency transform may be applied to the luminance data and the chrominance data on a per transform unit basis, and in the coding, the luminance data and the chrominance data may be coded to generate the bitstream in which the luminance data and the chrominance data are grouped on a per predetermined block basis.

With this, it is possible to combine and processes the Y, U, and V into respective multiple blocks and to input the input images in nearly one batch for each of the Y, U and V, thereby increasing data transfer efficiency. Moreover, variation in the number of pixels in a YUV set can be suppressed, and the computing unit operating rate can be increased when parallel processing YUV data units with multiple computing units.

Moreover, for example, each of the predetermined blocks may correspond to a different one of the transform units, in the applying, the frequency transform may be applied to the luminance data and the chrominance data on a per transform unit basis, and in the coding, the luminance data and the chrominance data may be coded to generate the bitstream in which the luminance data and the chrominance data are grouped on a per transform unit basis.

With this, the Y, U, and V are arranged in a bitstream in simple and appropriate data units. As a result, processing efficiency is increased.

Moreover, the image decoding method of decoding an image on a per coding unit basis according to one embodiment of the present disclosure may include: decoding luminance data and chrominance data of transform units in the coding unit including predetermined blocks each corresponding to one or more of the transform units, the decoding including obtaining a bitstream, and the luminance data and the chrominance data being data to which a frequency transform has been applied and which has been coded and grouped in the bitstream on a per predetermined block basis; and applying an inverse frequency transform to the decoded luminance data and the decoded chrominance data.

With this, U and V can be decoded even before every Y in the CU has been decoded, thereby eliminating the need to buffer the U and V decoding result and allowing for a reduced buffer memory or register.

For example, each of the predetermined blocks may correspond to transform units in a block of a predetermined size, or to a transform unit of a size greater than or equal to the predetermined size, and in the decoding, the bitstream in which the luminance data and the chrominance data are grouped on a per predetermined block basis may be obtained, and the luminance data and the chrominance data are decoded.

With this, a bitstream in which the Y, U, and V are arranged in appropriate data units is used. As a result, processing efficiency is increased.

Moreover, for example, in the applying: the inverse frequency transform may be applied to the luminance data on a per transform unit basis; when a total number of pixels of the chrominance data and a total number of pixels of the luminance data are equal, the inverse frequency transform may be applied to the chrominance data on a per transform unit basis; and when the total number of pixels of the chrominance data is less than the total number of pixels of the luminance data, the inverse frequency transform may be applied to the chrominance data on a per predetermined block basis.

With this, an inverse frequency transform is applied per data unit to the Y, U, and V, the data unit being a data unit appropriate for the number of pixels. As a result, processing efficiency is increased.

Moreover, for example, in the applying, the inverse frequency transform may be applied to, from among the chrominance data of the transform units in the coding unit, chrominance data of transform units in a block of a size that is smaller than or equal to the predetermined size in one inverse frequency transform.

With this, the data unit for transformation becoming too small can be avoided. As a result, it is not necessary to provide a small inverse transform circuit. Moreover, in contrast to a case in which Y had to be made larger than the smallest TU size in an effort to keep U or V from being smaller than the smallest TU, with this configuration, Y can be made to be the smallest TU size, resulting in increased coding efficiency.

Moreover, for example, in the applying, when a size of one of the transform units is a predetermined smallest size and in the transform unit a total number of pixels of the chrominance data is less than a total number of pixels of the luminance data, the inverse frequency transform may be applied to, from among the chrominance data of the transform units in the coding unit, chrominance data of transform units in a block including the transform unit in one inverse frequency transform.

With this, even when the TU size is the smallest TU size and the number of pixels in U or V is less than the number of pixels in Y, as is the case in a 4:2:0 or 4:2:2 format, neither U nor V are smaller than the smallest TU size. As a result, it is not necessary to provide an inverse transform circuit that is smaller than the smallest TU. Moreover, in contrast to a case in which Y had to be made larger than the smallest TU size in an effort to keep U or V from being smaller than the smallest TU, with this configuration, Y can be made to be the smallest TU size, resulting in increased coding efficiency.

Moreover, for example, in the decoding, the bitstream may be obtained in which, in one of the predetermined blocks, chrominance data of all transform units follows luminance data of all the transform units, and the luminance data and the chrominance data of the transform units in the predetermined block may be decoded.

With this, U and V follow Y, and this sequence is maintained. As a result, it is not necessary to take into consideration switching this sequence. Consequently, it is possible to reduce the complexity of the image processing.

For example, each of the predetermined blocks may correspond to transform units in a block of a predetermined size, or to a transform unit of a size greater than or equal to the predetermined size, in the decoding, the bitstream in which the luminance data and the chrominance data are grouped on a per predetermined block basis may be obtained, and the luminance data and the chrominance data are decoded, and in the applying, the inverse frequency transform may be applied to the luminance data and the chrominance data on a per transform unit basis.

With this, it is possible to combine and processes the Y, U, and V into respective multiple blocks and to output the output images in nearly one batch for each of the Y, U and V, thereby increasing data transfer efficiency. Moreover, variation in the number of pixels in a YUV set can be suppressed, and the computing unit operating rate can be increased when parallel processing YUV data units with multiple computing units.

Moreover, for example, each of the predetermined blocks may correspond to a different one of the transform units, in the decoding, the bitstream in which the luminance data and the chrominance data are grouped on a per transform unit basis may be obtained, and the luminance data and the chrominance data may be decoded, and in the applying, the inverse frequency transform may be applied to the luminance data and the chrominance data on a per transform unit basis.

With this, a bitstream in which the Y, U, and V are arranged in simple and appropriate data units is used. As a result, processing efficiency is increased.

It is to be noted that these general and specific aspects may be implemented using a system, an apparatus, an integrated circuit, a computer program, or a non-transitory computer-readable recording medium such as a CD-ROM, or any combination of systems, apparatuses, methods, integrated circuits, computer programs, or computer-readable recording media.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

(Configuration)

Figure 2:
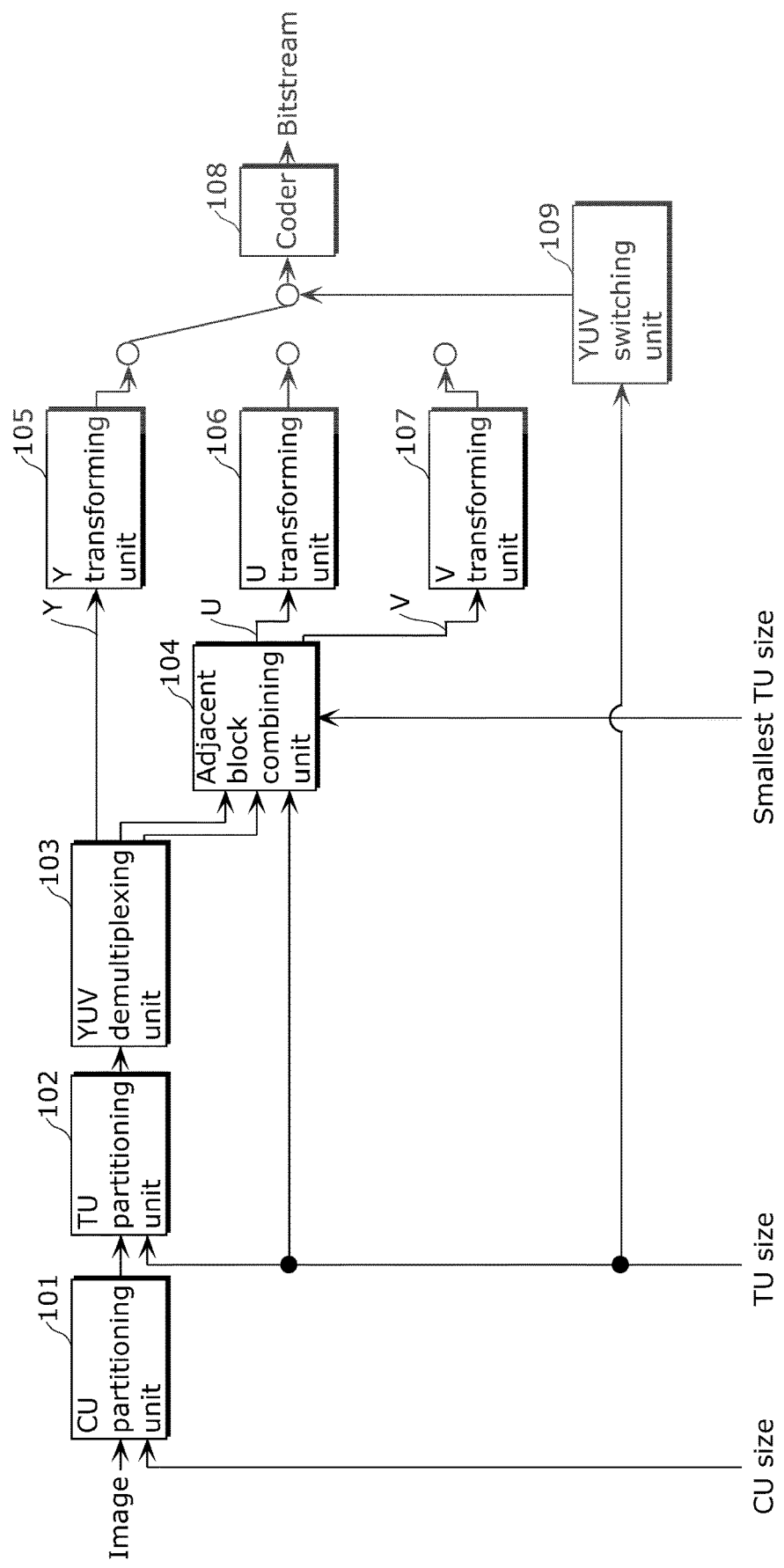
FIG. 2 is a block diagram illustrating a configuration of the image coding apparatus according to the first embodiment.

FIG. 2 shows a configuration of the image coding apparatus according to the first embodiment. The image coding apparatus partitions the input images into CUs and TUs, performs a transform process on and codes the Y, U, and V, then outputs a bitstream thereof. The image coding apparatus includes a CU partitioning unit 101, a TU partitioning unit 102, a YUV demultiplexing unit 103, an adjacent block combining unit 104, a Y transforming unit 105, a U transforming unit 106, a V transforming unit 107, a coder 108, and a YUV switching unit 109.

The CU partitioning unit 101 inputs an image and partitions the image according to a specified CU size. The TU partitioning unit 102 partitions the CU according to a specified TU size. The YUV demultiplexing unit 103 demultiplexes the TU into Y, U, and V components. In this embodiment, the image format is 4:2:0. In this format, the size of the U component and the V component are one-fourth the size of the Y component.

The adjacent block combining unit 104 combines adjacent U blocks and combines adjacent V blocks according to TU size and the smallest TU size. The Y transforming unit 105, the U transforming unit 106, and the V transforming unit 107 each perform a transform process on Y, U, and V, respectively. The coder 108 codes the transformed data and outputs a bitstream of the transformed data. The YUV switching unit 109 switches input to the coder 108 according to the TU size.

Figure 3:
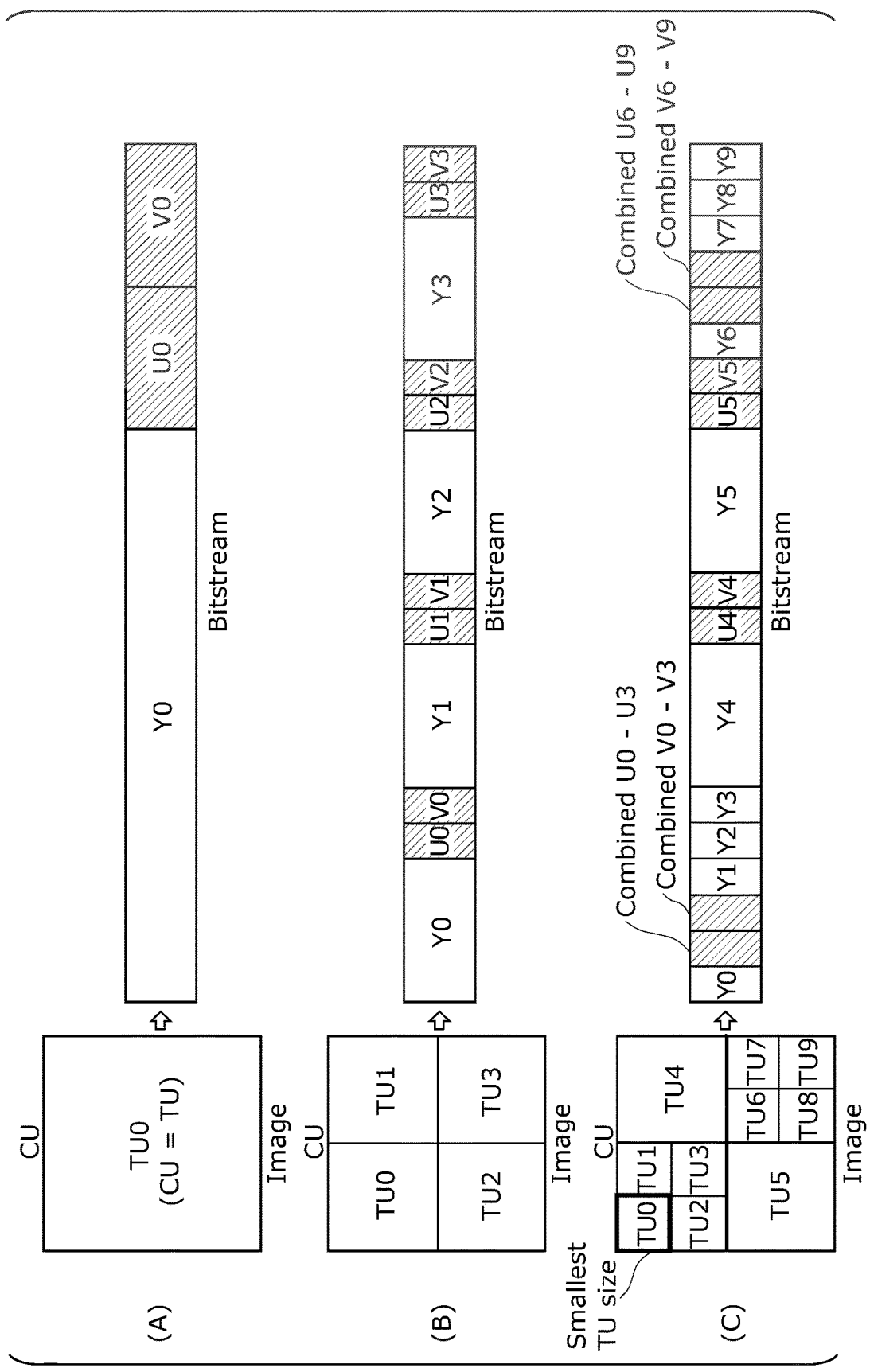
FIG. 3 illustrates the bitstream according to the first embodiment.

FIG. 3 shows an example of a bitstream. When the CU size and the TU size are the same as in (A) this is the same as in the conventional example shown in FIG. 1, but when the TU size is smaller than the CU as in (B), this is different from the conventional example. In this case, Y1, U1, and V1 in the TU1 are coded after the Y0, U0, and V0 in the TU0. Moreover, when the TU size is the smallest TU size as is TU0 in (C), the format is 4:2:0. As such, the U blocks and the V blocks are smaller than the smallest TU size. In this case, the respective U blocks and V blocks in TU0, TU1, TU2, and TU3 are combined, and transformation and coding is performed on the combined blocks, whereby a bitstream is generated.

(Operation)

Figure 4:
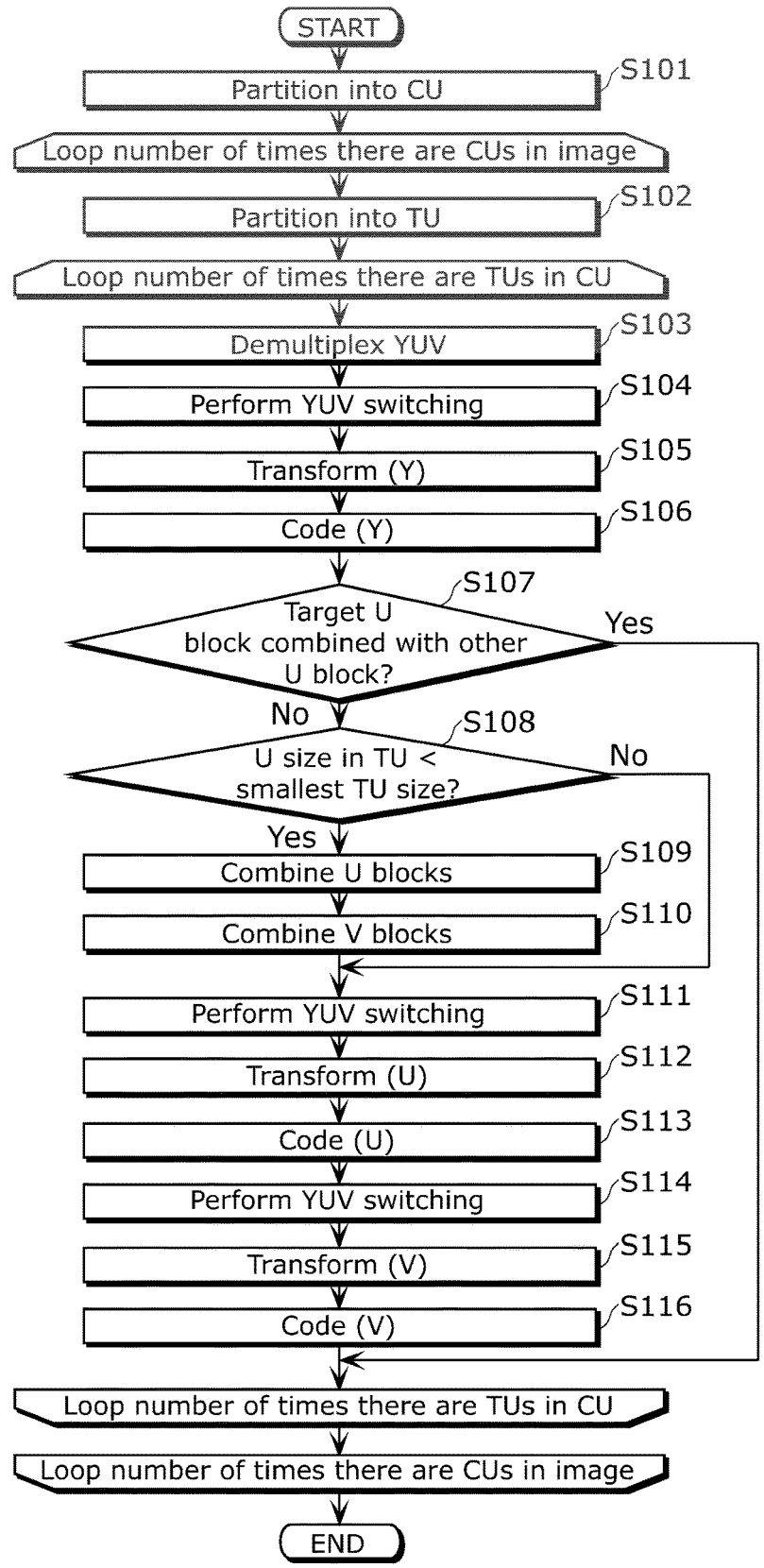
FIG. 4 is a flow chart illustrating the coding operation according to the first embodiment.

Next, the coding flow will be described with reference to FIG. 4. First, the CU partitioning unit 101 partitions the input image according to the specified CU size, generates the CU, and outputs the CU to the TU partitioning unit 102 (S101). The TU partitioning unit 102 partitions the CU according to a specified TU size, and outputs the result to the YUV demultiplexing unit 103 (S102). It is to be noted that the image coding apparatus repeats the CU processes (S102 to S116) a number of times that there are CUs in a single image since the processes are performed on all CUs within a single image.

Next, the YUV demultiplexing unit 103 demultiplexes the TU into Y, U, and V components (S103). In this embodiment, the image format is 4:2:0. In this format, the size of the U component and the V component are one-fourth the size of the Y component. The demultiplexed Y components are outputted to the Y transforming unit 105, and the U components and V components are outputted to the adjacent block combining unit 104. It is to be noted that the image coding apparatus repeats the TU processes (S103 to S116) a number of times that there are TUs in a single CU since the processes are performed on all TUs within a single CU.

Next, the YUV switching unit 109 switches the input to the coder 108 to be the output of the Y transforming unit 105 (S104). The Y transforming unit 105 performs the transform process on Y, and outputs the transformed result to the coder 108 (S105). The coder 108 codes the transformed Y and outputs a bitstream of the coded Y (S106).

Next, the adjacent block combining unit 104 determines whether the current U block to be transformed and coded is already combined with another U block (S107). If the U block is already combined with another U block (yes in S107), the processes for the U block and the V block (S108 to S116) are skipped. If the U block is not already combined with another U block (no in S107), the next process (S108) is performed.

Specifically, when the U block is not already combined with another U block (no in S107), the adjacent block combining unit 104 determines whether the size of the U in the TU is smaller than the smallest TU size (S108). If the size of the U is smaller than the smallest TU size (yes in S108), the U block combining process is performed (S109). If the size of the U is not smaller than the smallest TU size (no in S108), the adjacent block combining unit 104 outputs the current U block and the current V block to be transformed and coded to the U transforming unit 106 and the V transforming unit 107, respectively. A YUV switching process (S111) is then performed.

If the size of the U is smaller than the smallest TU size (yes in S108), the adjacent block combining unit 104 combines the current U block to be transformed and coded with three U blocks that are to the right, bottom, and bottom-right thereof, and generates and outputs a four-block combined U block to the U transforming unit 106 (S109). The adjacent block combining unit 104 then combines the current V block to be transformed and coded with three V blocks that are to the right, bottom, and bottom-right thereof, and generates and outputs a four-block combined V block to the V transforming unit 107 (S110).

Next, the YUV switching unit 109 switches the input to the coder 108 to be the output of the U transforming unit 106 (S111). The U transforming unit 106 performs the transform process on U, and outputs the transformed result to the coder 108 (S112). The coder 108 codes the transformed U and outputs a bitstream of the coded U (S113).

Next, the YUV switching unit 109 switches the input to the coder 108 to be the output of the V transforming unit 107 (S114). The V transforming unit 107 performs the transform process on V, and outputs the transformed result to the coder 108 (S115). The coder 108 codes the transformed V and outputs a bitstream of the coded V (S116).
(Result)

According to the first embodiment, U and V bitstreams can be outputted even before the bitstreams for every Y in the CU have been outputted, thereby eliminating the need to buffer U and V and allowing for a reduced buffer memory or register.

Moreover, even when the TU size is the smallest TU size and the number of pixels in U or V is less than the number of pixels in Y, as is the case in a 4:2:0 or 4:2:2 format, neither U nor V are smaller than the smallest TU size. As a result, it is not necessary to provide a transform circuit that is smaller than the smallest TU. Moreover, in contrast to a case in which Y had to be made larger than the smallest TU size in an effort to keep U or V from being smaller than the smallest TU, with this configuration, Y can be made to be the smallest TU size, resulting in increased coding efficiency.

It is to be noted that in the first embodiment a 4:2:0 format is used, but a 4:2:2, 4:4:4, or different format may be used.

Moreover, in the first embodiment, the CU size and the TU size are input externally. However, an optimum size may be used which is computed by calculating the coding efficiency of the size of multiple or all patterns internally in the apparatus.

Figure 5:
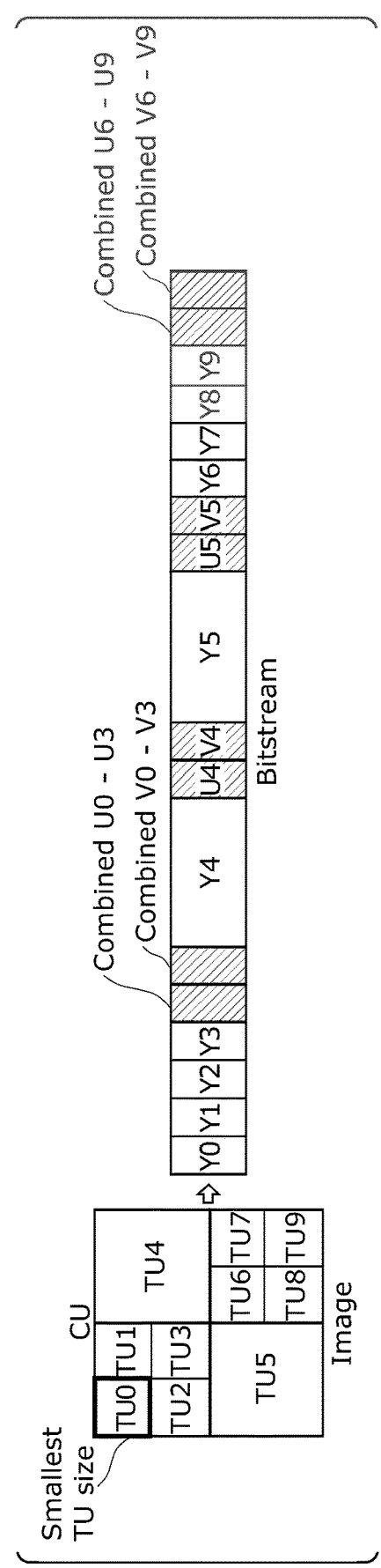
FIG. 5 illustrates the bitstream according to a variation of the first embodiment.

Moreover, in the first embodiment, combined U and combined V blocks are placed directly after the bitstream for the Y of the TU to the upper-left in the combined TU, as shown in FIG. 3. However, the combined U and combined V blocks may be placed directly after the bitstream for the Y of the TU to the bottom-right in the combined TU, as shown in FIG. 5. In this case, the operation shown in FIG. 4 is modified to the operation shown in FIG. 6, for example.

Figure 6:
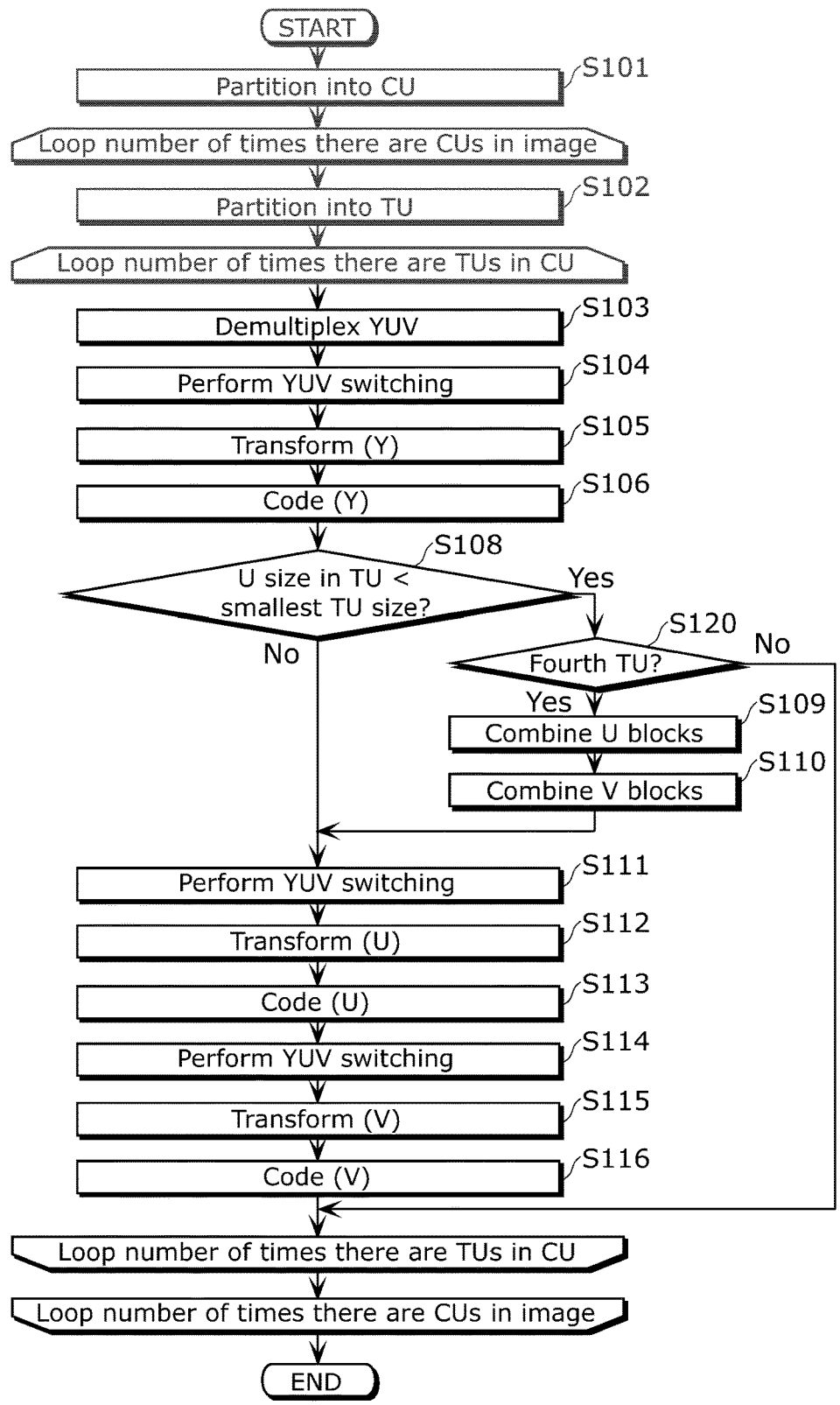
FIG. 6 is a flow chart illustrating the coding operation according to a variation of the first embodiment.

Specifically, as is shown in FIG. 6, when the size of the U in the TU is larger than or equal to the smallest TU size (no in S108), the U and V blocks are processed as is (S111 to S116).

When the size of the U in the TU is smaller than the smallest TU size (yes in S108) and the TU to be processed is the fourth TU (yes in S120), the U block combining process (S109) and the V block combining process (S110) are performed. Here, the fourth TU corresponds to the fourth TU to be processed among the four smallest TUs, such as TU3 or TU9 in FIG. 5.

In the U block combining process (S109), the adjacent block combining unit 104 combines the U block to be processed with the three U blocks that are to the left, top, and top-left thereof, and generates a four-block combined U block. Moreover, in the U block combining process (S110), the adjacent block combining unit 104 combines the V block to be processed with the three V blocks that are to the left, top, and top-left thereof, and generates a four-block combined V block. The U and V blocks are then processed (S111 to S116).

When the size of the U in the TU is smaller than the smallest TU size (yes in S108) and the TU to be processed is not the fourth TU (no in S120), the processing of the U and V blocks (S111 to S116) is skipped. Other operations are the same as those shown in FIG. 4. In this way, the bitstream shown in FIG. 5 is output as a result of the operation being modified.

In FIG. 5, U and V follow Y, and this sequence is maintained. As a result, it is not necessary to take into consideration switching the sequence of Y, U, and V. Consequently, it is possible to reduce the complexity of the image processing. In FIG. 6, it is determined whether or not the TU to be processed is the fourth TU, but it may be determined whether or not the TU to be processed is the last TU to be combined. When the TU to be processed is the last TU to be combined, the combining processes (S109 and S110) may be performed.

Moreover, in the first embodiment, four blocks are combined, but it is acceptable if two blocks are combined in a 4:2:2 format. For example, two blocks horizontally adjacent to each other may be combined. Then, among the two blocks, it is acceptable if the combining process is performed on the first or second block to be processed.

Furthermore, the processing performed in the first embodiment may be executed with software. The software may be distributed via downloading. Moreover, the software may be stored on a storage medium such as a CD-ROM and distributed. It is to be noted that this applies to all other embodiments throughout the Description as well.

Embodiment 2

(Configuration)

Figure 7:
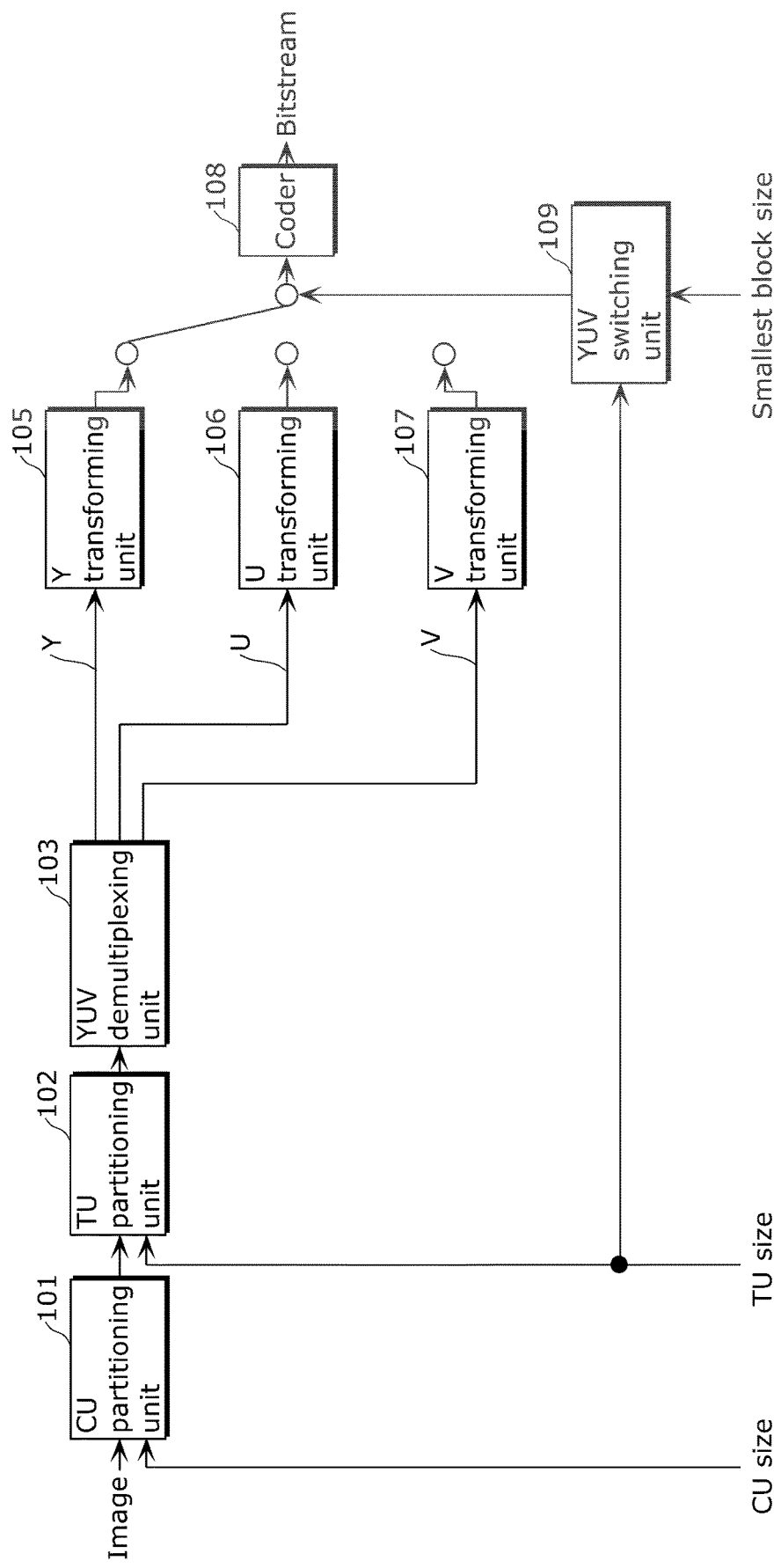
FIG. 7 is a block diagram illustrating a configuration of the image coding apparatus according to the second embodiment.

FIG. 7 shows a configuration of the image coding apparatus according to the second embodiment. Here, only the YUV switching unit 109 is described since the YUV switching unit 109 is different from the first embodiment.

The YUV switching unit 109 switches input to the coder 108 according to TU size and the specified smallest block size. Specifically, the YUV switching unit 109 switches the input to the coder 108 on a per data unit basis to be either Y, U, or V, the data unit being the larger of the TU size and the smallest block size. In the second embodiment, the smallest block size is a predetermined, fixed size that is larger than the smallest TU size.

Figure 8:
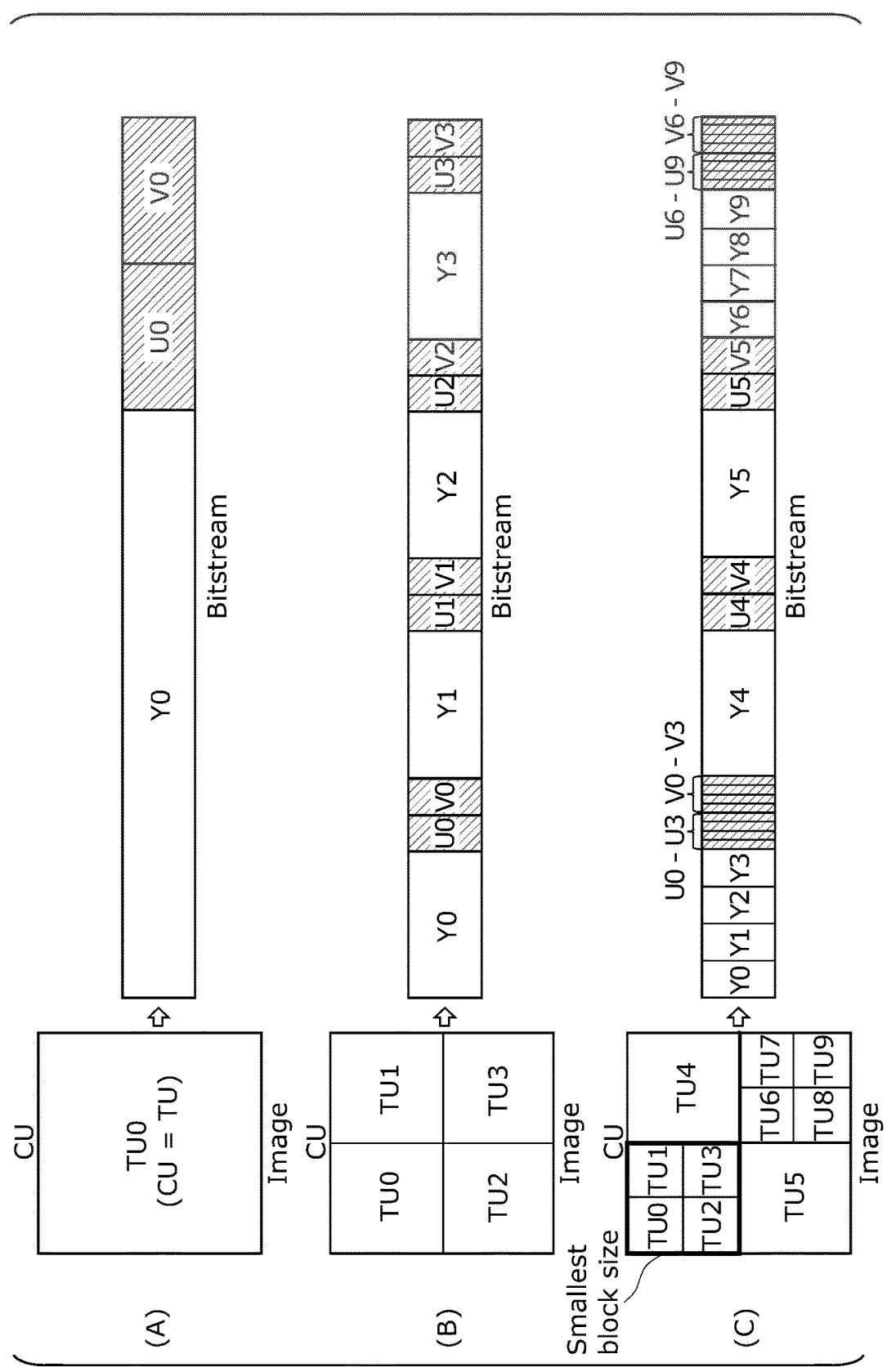
FIG. 8 illustrates the bitstream according to the second embodiment.

FIG. 8 shows an example of a bitstream. When the TU size is not smaller than the smallest block size such as in (A) or (B), the bitstream is the same as the first embodiment, but when the TU size is smaller than the smallest block size such as in (C), this is different from the first embodiment. Here, for TU0 through TU3, first U0 through U3 and V0 through V3 are coded after Y0 through Y3, followed by Y4, U4, and V4 of TU4.

(Operation)

Figure 9:
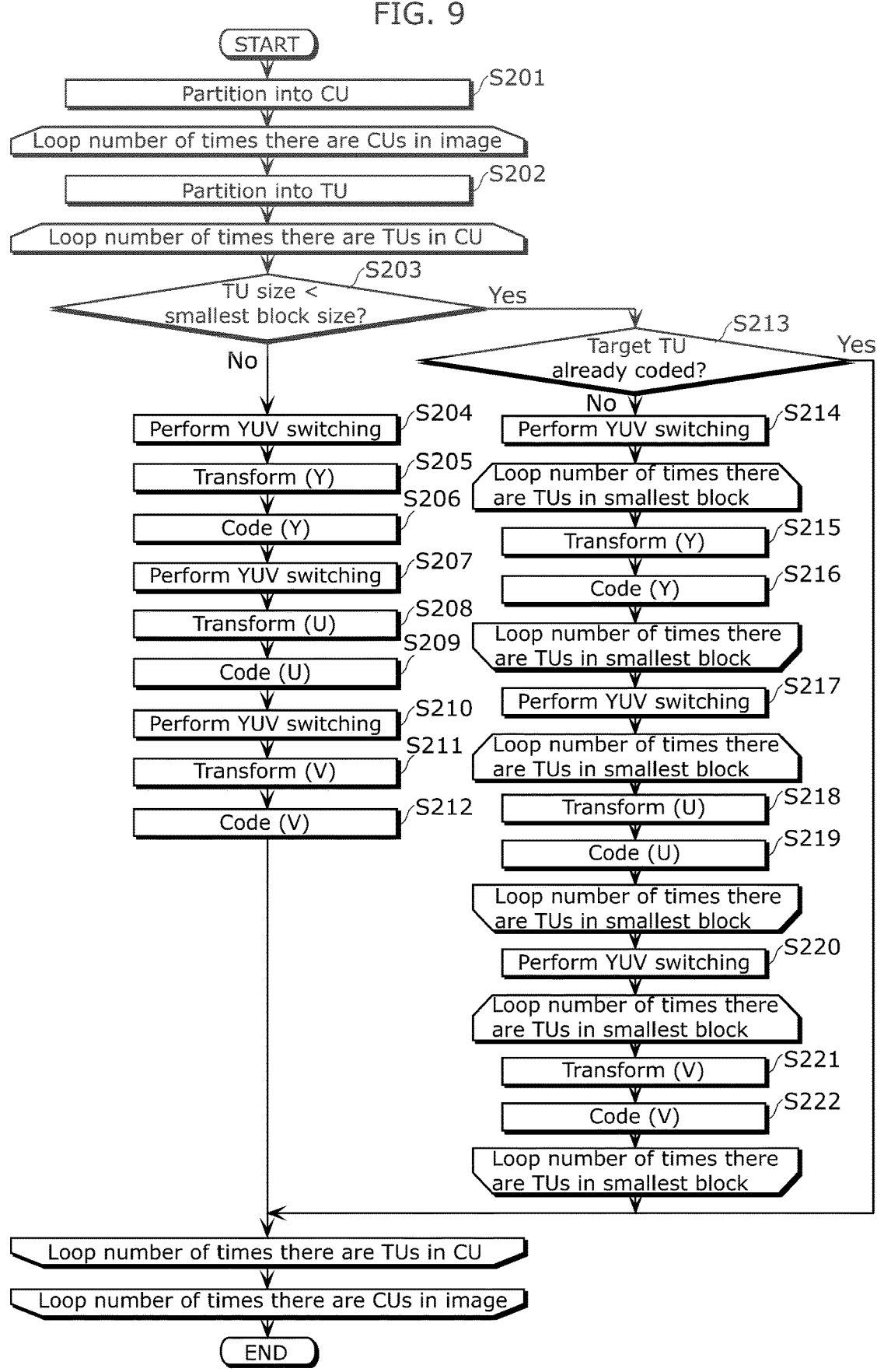
FIG. 9 is a flow chart illustrating the coding operation according to the second embodiment.

Next, the coding flow is described with reference to FIG. 9. First, the CU partitioning unit 101 partitions the input image according to the specified CU size, generates the CU, and outputs the CU to the TU partitioning unit 102 (S201). The TU partitioning unit 102 partitions the CU according to a specified TU size, and outputs the result to the YUV demultiplexing unit 103 (S202). It is to be noted that the image coding apparatus repeats the CU processes (S202 to S222) a number of times that there are CUs in a single image since the processes are performed on all CUs within a single image.

Next, the YUV switching unit 109 determines whether the TU size is smaller than the smallest block size (S203). If the TU size is smaller than the smallest block size (yes in S203), a coding determination process (S213) is performed. If the TU size is not smaller than the smallest block size (no in S203), a YUV switching process (S204) is performed. It is to be noted that the image coding apparatus repeats the TU processes (S203 to S222) a number of times that there are TUs in a single CU since the processes are performed on all TUs within a single CU.

If the TU size is not smaller than the smallest block size (no in S203), the YUV switching unit 109 switches the input to the coder 108 to be the output of the Y transforming unit 105 (S204). The Y transforming unit 105 performs the transform process on Y, and outputs the transformed result to the coder 108 (S205). The coder 108 codes the transformed Y and outputs a bitstream of the coded Y (S206).

Next, the YUV switching unit 109 switches the input to the coder 108 to be the output of the U transforming unit 106 (S208). The U transforming unit 106 performs the transform process on U, and outputs the transformed result to the coder 108 (S208). The coder 108 codes the transformed U and outputs a bitstream of the coded U (S209).

Next, the YUV switching unit 109 switches the input to the coder 108 to be the output of the V transforming unit 107 (S210). The V transforming unit 107 performs the transform process on V, and outputs the transformed result to the coder 108 (S211). The coder 108 codes the transformed V and outputs a bitstream of the coded V (S212).

If the TU size is smaller than the smallest block size (yes in S203), the YUV switching unit 109 determines whether the current Y block, U block, and V block to be transformed and coded are already coded (S213). If already coded (yes in S213), the processes for the TU (S214 to S222) are skipped. If not already coded (no in S213), a YUV switching process (S214) is performed.

Specifically, if the Y, U, and V blocks are not already coded (no in S213), the YUV switching unit 109 switches the input to the coder 108 to be the output of the Y transforming unit 105 (S214). The Y transforming unit 105 performs the transform process on Y, and outputs the transformed result to the coder 108 (S215). It is to be noted that the image coding apparatus repeats the Y processes (S215 to S216) a number of times that there are TUs in a smallest block since the processes are performed on all TUs within the smallest block. The coder 108 codes the transformed Y and outputs a bitstream of the coded Y (S216).

Next, the YUV switching unit 109 switches the input to the coder 108 to be the output of the U transforming unit 106 (S217). The U transforming unit 106 performs the transform process on U, and outputs the transformed result to the coder 108 (S218). It is to be noted that the image coding apparatus repeats the U processes (S218 to S219) a number of times that there are TUs in a smallest block since the processes are performed on all TUs within the smallest block. The coder 108 codes the transformed U and outputs a bitstream of the coded U (S219).

Next, the YUV switching unit 109 switches the input to the coder 108 to be the output of the V transforming unit 107 (S220). The V transforming unit 107 performs the transform process on V, and outputs the transformed result to the coder 108 (S221). It is to be noted that the image coding apparatus repeats the V processes (S221 to S222) a number of times that there are TUs in a smallest block since the processes are performed on all TUs within the smallest block. The coder 108 codes the transformed V and outputs a bitstream of the coded V (S222).

(Result)

With the second embodiment, it is possible to combine and processes the Y, U, and V into respective multiple blocks and to input the input images in nearly one batch for each of the Y, U and V, thereby increasing data transfer efficiency. This is especially effective in a system which uses high-speed memory such as cache memory, since the capability to process Y or U or V in sequence leads to an improvement in cache memory hit ratio. Moreover, variation in the number of pixels in a YUV set can be suppressed, and the computing unit operating rate can be increased when parallel processing YUV data units with multiple computing units. A specific example will be given with reference to FIG. 10.

Figure 10:
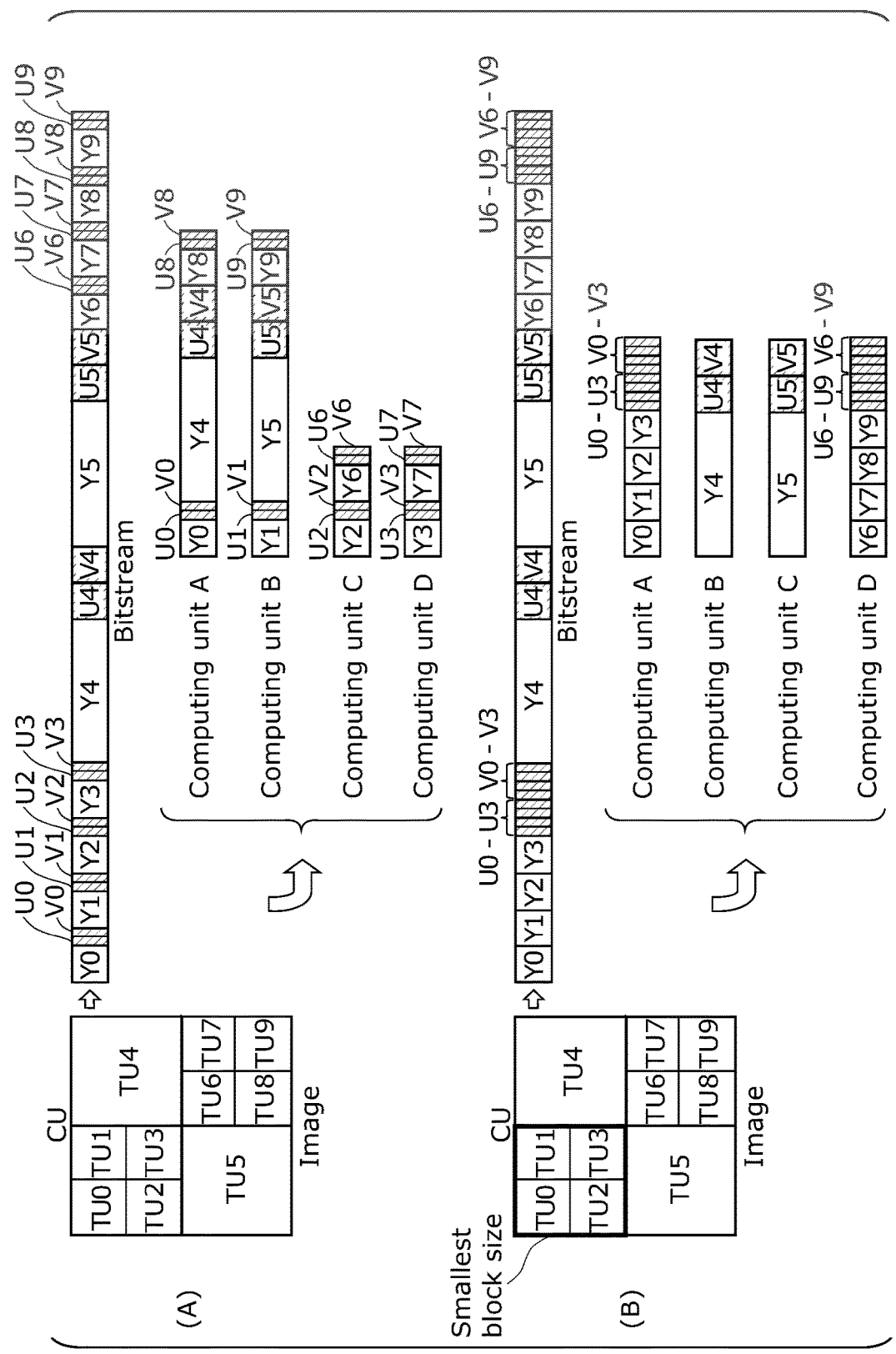
FIG. 10 illustrates the division and allocation of processing for the multiple computing units according to the second embodiment.

FIG. 10 illustrates a system in which four computing units are used to process the YUV set wherein the YUV set is divided and allocated to the computing units A through D in order from the beginning. When the YUV are consistently arranged by TU size such as in (A), the processing load required of the computing unit C and the computing unit D is small compared to that of the computing unit A and the computing unit B. Consequently, the operating rate of the computing unit C and the computing unit D decreases. However, by arranging the YUV per data unit of the larger of the smallest block size and the TU size such as in the second embodiment, the processing load is equal for each of the computing units A through D, thereby increasing the operating rate of the computing unit C and the computing unit D.

Embodiment 3

(Configuration)

Figure 11:
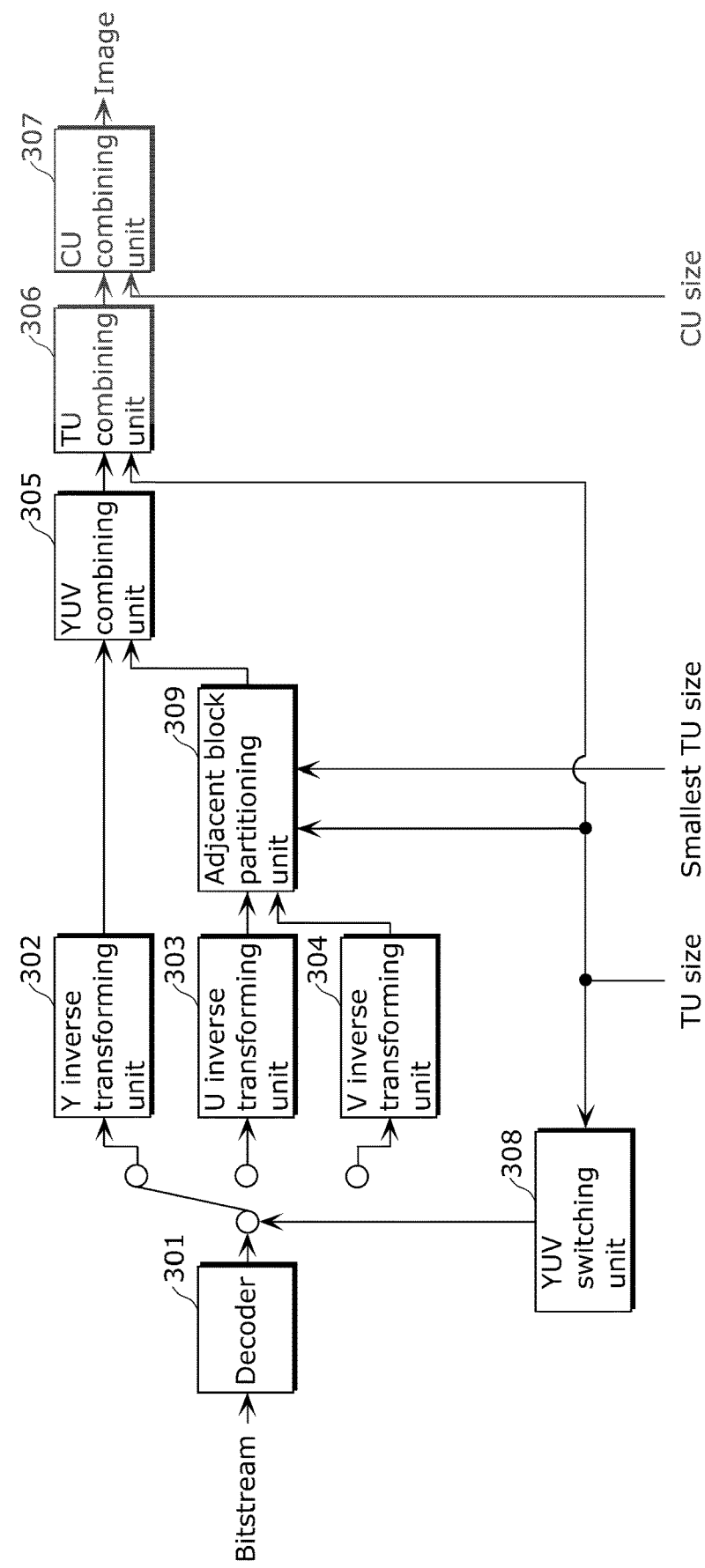
FIG. 11 is a block diagram illustrating a configuration of the image decoding apparatus according to the third embodiment.

FIG. 11 shows a configuration of the image decoding apparatus according to the third embodiment. The image decoding apparatus is used when decoding the bitstream coded by the image coding apparatus described in the first embodiment. The image decoding apparatus includes a decoder 301, a Y inverse transforming unit 302, a U inverse transforming unit 303, a V inverse transforming unit 304, a YUV combining unit 305, a TU combining unit 306, a CU combining unit 307, a YUV switching unit 308, and an adjacent block partitioning unit 309.

The decoder 301 decodes a bitstream and outputs the transformed YUV data. The Y inverse transforming unit 302, the U inverse transforming unit 303, and the V inverse transforming unit 304 each perform an inverse transform process on Y, U, and V, respectively. The YUV combining unit 305 combines the Y, U, and V components. In this embodiment, the image format is 4:2:0. In this format, the size of the U component and the V component are one-fourth the size of the Y component.

The TU combining unit 306 combines the TU in the CU according to a specified TU size, and generates the CU. The CU combining unit 307 combines the CU in an image according to a specified CU size and generates the image. The YUV switching unit 308 switches the output destination of the decoder 301 according to the TU size. The adjacent block partitioning unit 309 partitions the inverse transforming result for each of the U and V four ways according to the TU size and the smallest TU size.

(Operation)

Next, the decoding flow will be described with reference to FIG. 12. First, the YUV switching unit 308 switches the output destination of the decoder 301 to be the Y inverse transforming unit 302 (S301). It is to be noted that the image decoding apparatus repeats the TU processes (S301 to S314) a number of times that there are TUs in a single CU since the processes are performed on all TUs within a single CU. Moreover, the image decoding apparatus repeats the CU processes (S301 to S315) a number of times that there are CUs in a single image since the processes are performed on all CUs within a single image.

Next, the decoder 301 decodes and outputs a bitstream to the Y inverse transforming unit 302 (S302). The Y inverse transforming unit 302 performs an inverse transform process on Y, and outputs the inverse transformed result to the YUV combining unit 305 (S303).

Next, the adjacent block partitioning unit 309 determines whether the current U block to be decoded as already been decoded (S304). If the U block has already been decoded (yes in S304), the processes for the U block and the V block (S305 to S313) are skipped. If not already decoded (no in S304), a YUV switching process (S305) is performed.

Specifically, if the U block has not already been decoded (no in S304), the YUV switching unit 308 switches the output of the decoder 301 to be input to the U inverse transforming unit 303 (S305). Next, the decoder 301 decodes and outputs a bitstream to the U inverse transforming unit 303 (S306). The U inverse transforming unit 303 performs an inverse transform process on U, and outputs the inverse transformed result to the adjacent block partitioning unit 309 (S307).

Next, the YUV switching unit 308 switches the output destination of the decoder 301 to be the V inverse transforming unit 304 (S308). The decoder 301 then decodes and outputs a bitstream to the V inverse transforming unit 304 (S309). The V inverse transforming unit 304 performs an inverse transform process on V, and outputs the inverse transformed result to the adjacent block partitioning unit 309 (S310).

Next, the adjacent block partitioning unit 309 determines whether the size of the U within the TU is smaller than the smallest TU size (S311). If the size of the U is smaller than the smallest TU size (yes in S311), a U block partitioning process is performed (S312). If the size of the U is not smaller than the smallest TU size (no in S311), the inverse transformed result of the input U and V are output to the YUV combining unit 305 as is, and a YUV combining process is performed (S314).

If the size of the U is smaller than the smallest TU size (yes in S311), the adjacent block partitioning unit 309 partitions the inverse transformed U block in half heightwise and lengthwise resulting in a four partitioned parts, and outputs the result to the YUV combining unit 305 (S312). The adjacent block partitioning unit 309 partitions the inverse transformed V block in half heightwise and lengthwise resulting in a four partitioned parts, and outputs the result to the YUV combining unit 305 (S313).

The YUV combining unit 305 combines the Y, U, and V components and generates a TU pixel value (S314). The TU combining unit 306 combines the TU in the CU and generates the CU (S315). The CU combining unit 307 combines the CU in an image and generates the image (S316).

(Result)

With the third embodiment, it is possible to decode U and V even before every Y in the CU has been decoded, thereby eliminating the need to buffer the U and V decoding result and allowing for a reduced buffer memory or register.

Moreover, even when the TU size is the smallest TU size and the number of pixels in U or V is less than the number of pixels in Y, as is the case in a 4:2:0 or 4:2:2 format, neither U nor V are smaller than the smallest TU size. As a result, it is not necessary to provide an inverse transform circuit that is smaller than the smallest TU.

Moreover, in contrast to a case in which Y had to be made larger than the smallest TU size in an effort to keep U or V from being smaller than the smallest TU, with this configuration, Y can be made to be the smallest TU size, resulting in increased coding efficiency.

It is to be noted that in the third embodiment a 4:2:0 format is used, but a 4:2:2, 4:4:4, or different format may be used. When a 4:2:2 format is used, the adjacent block partitioning unit 309 may partition the U and V blocks heightwise into two parts instead of partitioning the U and V blocks into four parts (S312 and S313 in FIG. 12).

Moreover, in the third embodiment, the CU size and the TU size are input externally. However, the CU size and the TU size may be present within the bitstream. The decoder 301 may decode and obtain the CU size and the TU size.

Figure 12:
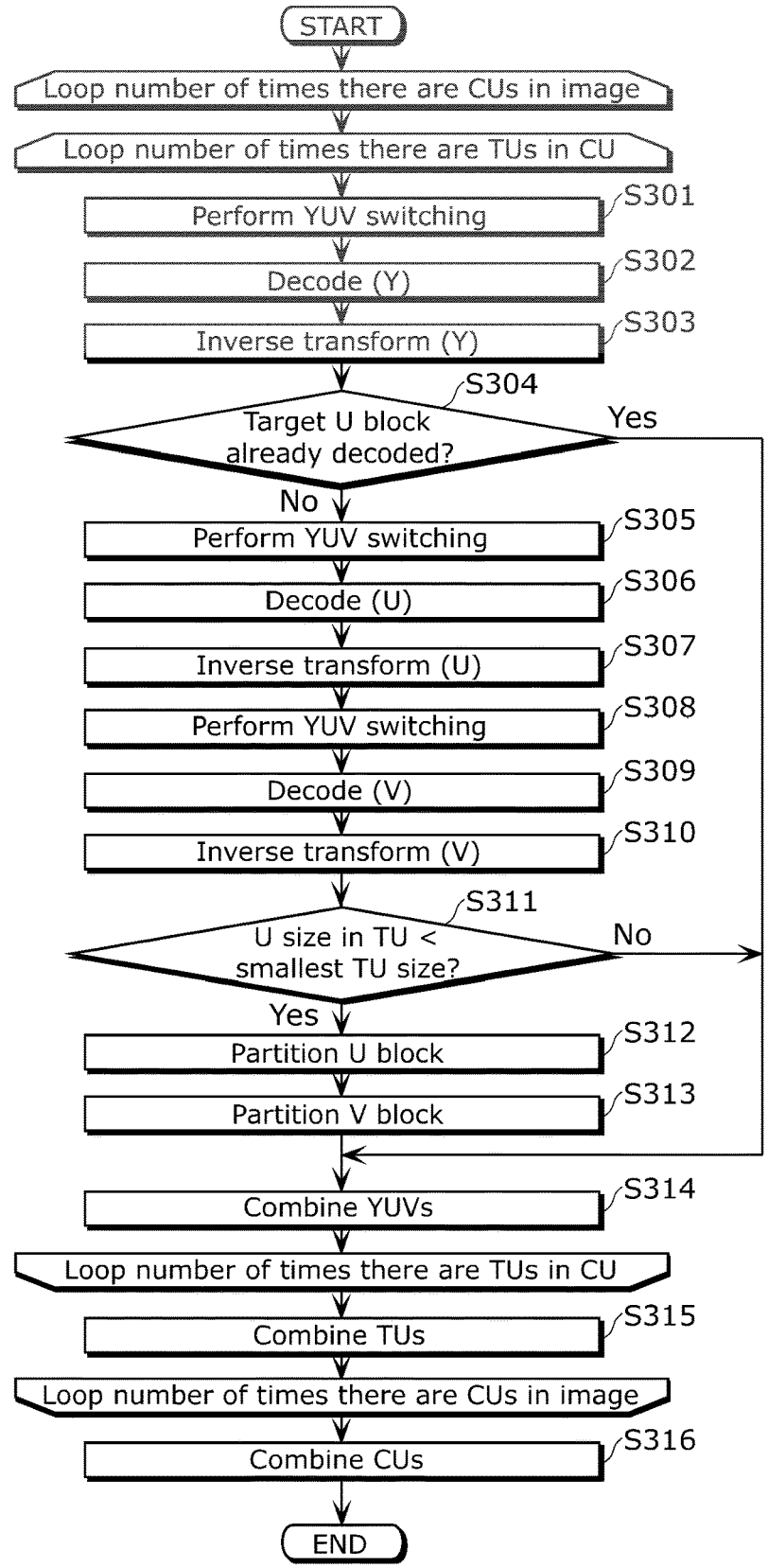
FIG. 12 is a flow chart illustrating the decoding operation according to the third embodiment.

Moreover, when the bitstream shown in FIG. 5 is used, the adjacent block partitioning unit 309 may determine whether the U block to be processed is present or not instead of determining whether the U block has already been decoded or not (S304 in FIG. 12). If the U block to be processed is not present, the image decoding apparatus may skip the U and V processes (S305 to S314 in FIG. 12). With this, the image decoding apparatus can decode the bitstream shown in FIG. 5 just as it can the bitstream shown in FIG. 3.

Embodiment 4

(Configuration)

Figure 13:
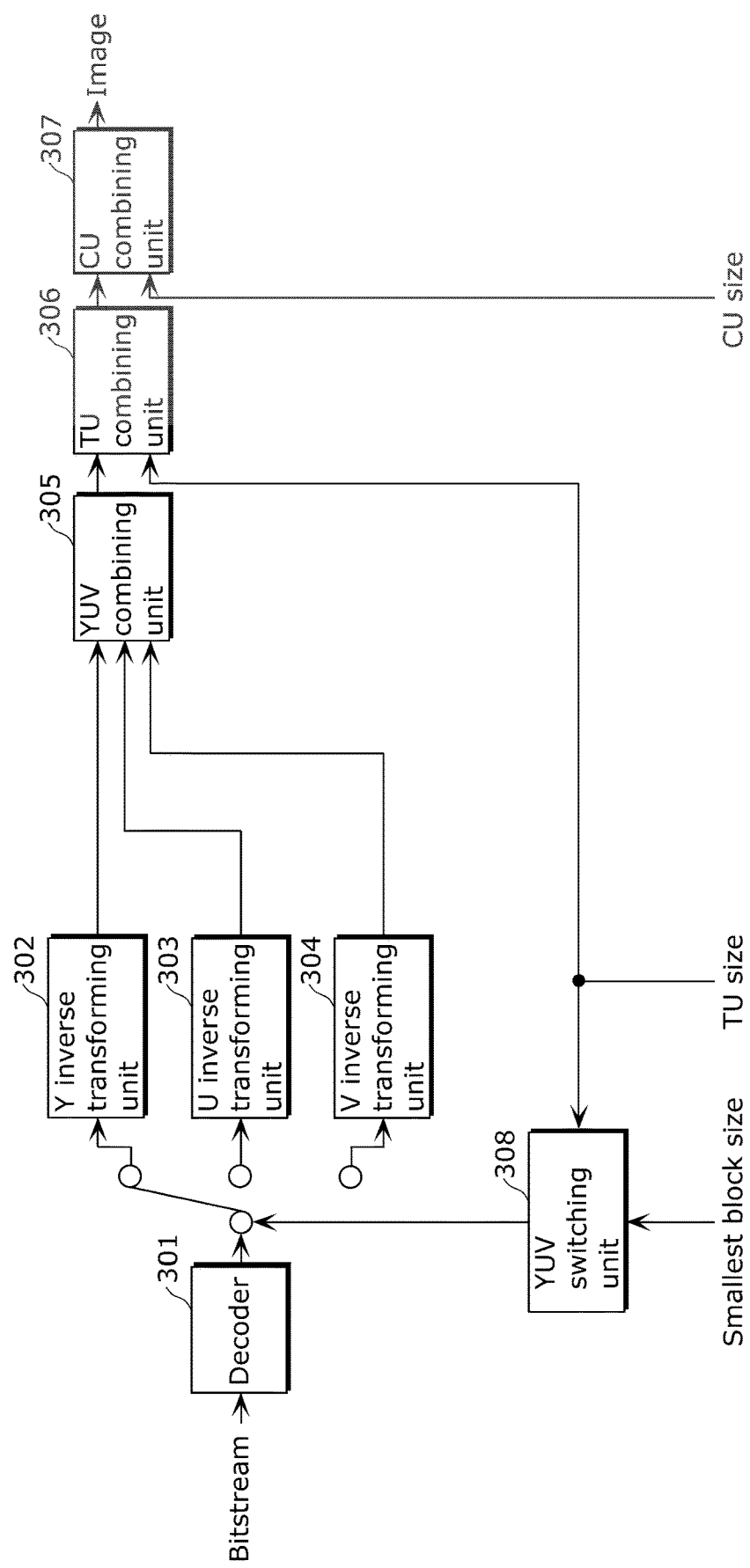
FIG. 13 is a block diagram illustrating a configuration of the image decoding apparatus according to the fourth embodiment.

FIG. 13 shows a configuration of the image decoding apparatus according to the fourth embodiment. The image decoding apparatus is used when decoding the bitstream coded by the image coding apparatus described in the second embodiment. Here, only the YUV switching unit 308 is described since the YUV switching unit 308 is different from the third embodiment.

The YUV switching unit 308 switches the output destination of the decoder 301 according to the TU size and the specified smallest block size. Specifically, the YUV switching unit switches the output of the decoder 301 on a per data unit basis to the Y inverse transforming unit 302, the U inverse transforming unit 303, or the V inverse transforming unit 304. Here, the data unit is the larger of the TU size and the smallest block size.

(Operation)

Figure 14:
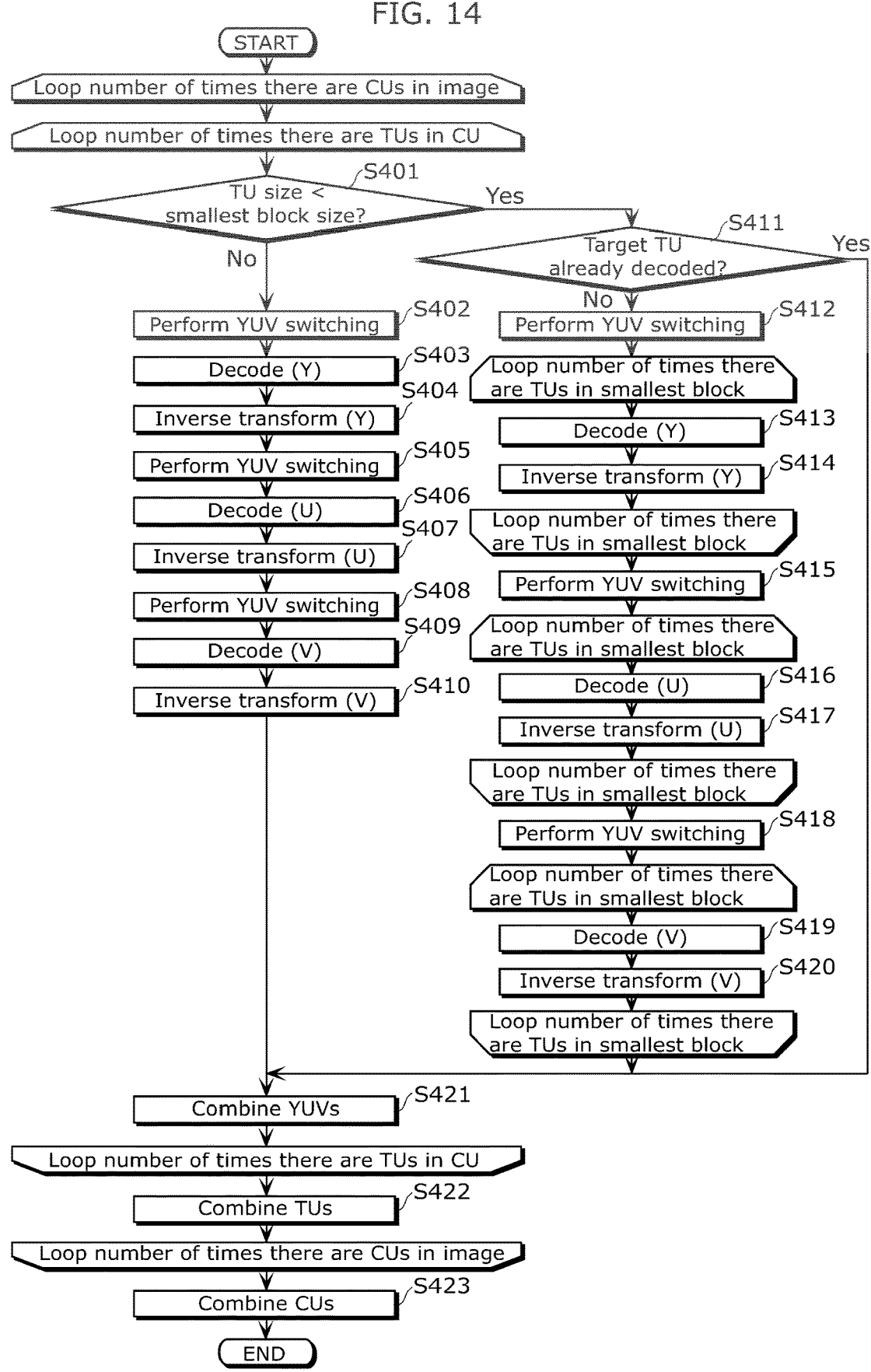
FIG. 14 is a flow chart illustrating the decoding operation according to the fourth embodiment.

Next, the decoding flow will be described with reference to FIG. 14. First, the YUV switching unit 308 determines whether the TU size is smaller than the smallest block size (S401). If the TU size is smaller than the smallest block size (yes in S401), a decoding determination process (S411) is performed. If the TU size is not smaller than the smallest block size (no in S401), a YUV switching process (S402) is performed.

It is to be noted that the image decoding apparatus repeats the TU processes (S401 to S421) a number of times that there are TUs in a single CU since the processes are performed on all TUs within a single CU. Moreover, the image decoding apparatus repeats the CU processes (S401 to S422) a number of times that there are CUs in a single image since the processes are performed on all CUs within a single image.

After a determination has been made, when the TU size is not smaller than the smallest block size (no in S401), the YUV switching unit 308 switches the output destination of the decoder 301 to be the Y inverse transforming unit 302 (S402). Next, the decoder 301 decodes and outputs a bitstream to the Y inverse transforming unit 302 (S403). The Y inverse transforming unit 302 performs an inverse transform process on Y, and outputs the inverse transformed result to the YUV combining unit 305 (S404).

Next, the YUV switching unit 308 switches the output destination of the decoder 301 to be the U inverse transforming unit 303 (S405). The decoder 301 decodes and outputs a bitstream to the U inverse transforming unit 303 (S406). The U inverse transforming unit 303 performs an inverse transform process on U, and outputs the inverse transformed result to the YUV combining unit 305 (S407).

Next, the YUV switching unit 308 switches the output destination of the decoder 301 to be the V inverse transforming unit 304 (S408). The decoder 301 then decodes and outputs a bitstream to the V inverse transforming unit 304 (S409). The V inverse transforming unit 304 performs an inverse transform process on V, and outputs the inverse transformed result to the YUV combining unit 305 (S410).

If the TU size is smaller than the smallest block size (yes in S401), the YUV switching unit 308 determines whether the current block to be decoded has already been decoded (S411). If the block has already been decoded (yes in S411), a YUV combining process (S421) is performed. If not already decoded (no in S411), a YUV switching process (S412) is performed.

Specifically, when the block has not yet been decoded (no in S411), the YUV switching unit 308 switches the output destination of the decoder 301 to be the Y inverse transforming unit 302 (S412). Next, the decoder 301 decodes and outputs a bitstream to the Y inverse transforming unit 302 (S413). It is to be noted that the image decoding apparatus repeats the Y processes (S413 to S414) a number of times that there are TUs in a smallest block since the processes are performed on all TUs within the smallest block. The Y inverse transforming unit 302 performs an inverse transform process on Y, and outputs the inverse transformed result to the YUV combining unit 305 (S414).

Next, the YUV switching unit 308 switches the output destination of the decoder 301 to be the U inverse transforming unit 303 (S415). The decoder 301 decodes and outputs a bitstream to the U inverse transforming unit 303 (S416). It is to be noted that the image decoding apparatus repeats the U processes (S416 to S417) a number of times that there are TUs in a smallest block since the processes are performed on all TUs within the smallest block. The U inverse transforming unit 303 performs an inverse transform process on U, and outputs the inverse transformed result to the YUV combining unit 305 (S417).

Next, the YUV switching unit 308 switches the output destination of the decoder 301 to be the V inverse transforming unit 304 (S418). The decoder 301 then decodes and outputs a bitstream to the V inverse transforming unit 304 (S419). It is to be noted that the image decoding apparatus repeats the V processes (S419 to S420) a number of times that there are TUs in a smallest block since the processes are performed on all TUs within the smallest block. The V inverse transforming unit 304 performs an inverse transform process on V, and outputs the inverse transformed result to the YUV combining unit 305 (S420).

After the processes have been performed on each of the Y, U, and V, the YUV combining unit 305 combines the Y, U, and V components and generates a TU pixel value (S421). The TU combining unit 306 combines the TU in the CU and generates the CU (S422). The CU combining unit 307 combines the CU in an image and generates the image (S423).

(Result)

With the fourth embodiment, it is possible to combine and processes the Y, U, and V into respective multiple blocks and to output the output images in nearly one batch for each of the Y, U and V, thereby increasing data transfer efficiency. Moreover, variation in the number of pixels in a YUV set can be suppressed, and the computing unit operating rate can be increased when parallel processing YUV data units with multiple computing units.

Embodiment 5

In the fifth embodiment, the characteristic configurations and procedures of the first through fourth embodiments are described for confirmation purposes. The configurations and procedures according to the fifth embodiment correspond to the configuration and procedures described in the first through fourth embodiments. That is, the concepts described in the first through fourth embodiments include the configurations and procedures according to the fifth embodiment.

Figure 15A:
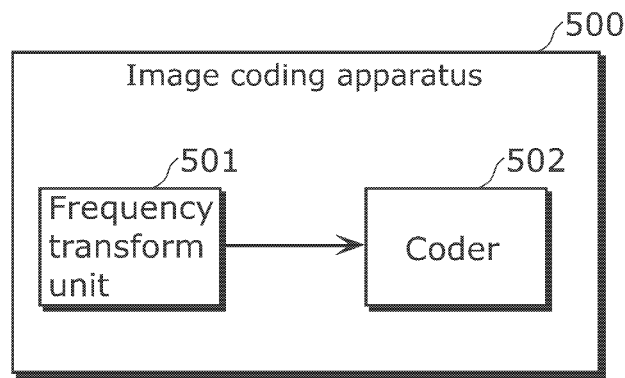
FIG. 15A is a block diagram illustrating a configuration of the image coding apparatus according to the fifth embodiment.

FIG. 15A is a block diagram illustrating a configuration of the image coding apparatus according to the fifth embodiment. The image coding apparatus 500 shown in FIG. 15A codes an image on a per coding unit basis. Moreover, the image coding apparatus 500 includes a frequency transform unit 501 and a coder 502. The frequency transform unit 501 corresponds to, for example, the Y transforming unit 105, the U transforming unit 106, and the V transforming unit 107 described in the first or second embodiment. The coder 502 corresponds to, for example, the coder 108 described in the first or second embodiment.

Figure 15B:
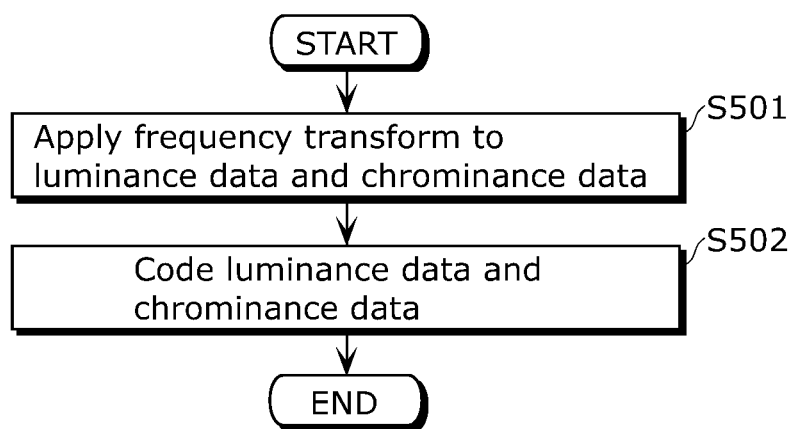
FIG. 15B is a flow chart illustrating the coding operation according to the fifth embodiment.

FIG. 15B is a flowchart which illustrates the operations of the image coding apparatus 500 shown in FIG. 15A.

First, the frequency transform unit 501 applies a frequency transform to the luminance data and the chrominance data of the plurality of transform units in a coding unit (S501). The coding unit includes a plurality of predetermined blocks. Each of the predetermined blocks corresponds to one or more transform units.

Next, the coder 502 codes the frequency transformed luminance data and the frequency transformed chrominance data, and outputs a bitstream thereof (S502). This bitstream is a bitstream of the luminance data and the chrominance data combined on a per predetermined block basis.

With this, the memory or register for buffering the data of the plurality of transform units can be reduced. That is, am image is efficiently coded.

Figure 16A:
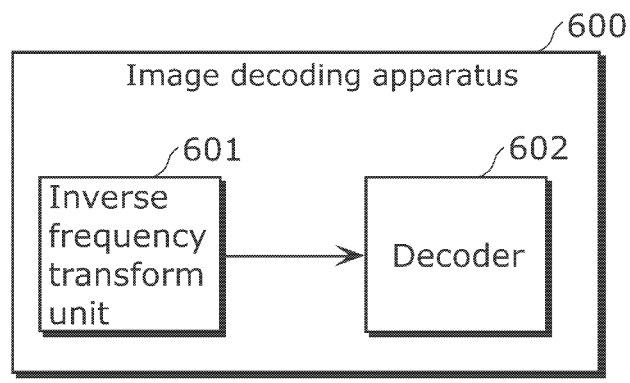
FIG. 16A is a block diagram illustrating a configuration of the image decoding apparatus according to the fifth embodiment.

FIG. 16A is a block diagram illustrating a configuration of the image decoding apparatus according to the fifth embodiment. The image decoding apparatus 600 shown in FIG. 16A decodes an image on a per coding unit basis. Moreover, the image decoding apparatus 600 includes a decoder 601 and an inverse frequency transform unit 602. The decoder 601 corresponds to, for example, the decoder 301 described in the third or fourth embodiment. The inverse frequency transform unit 602 corresponds to, for example, the Y inverse transforming unit 302, the U inverse transforming unit 303, and the V inverse transforming unit 304 described in the third or fourth embodiment.

Figure 16B:
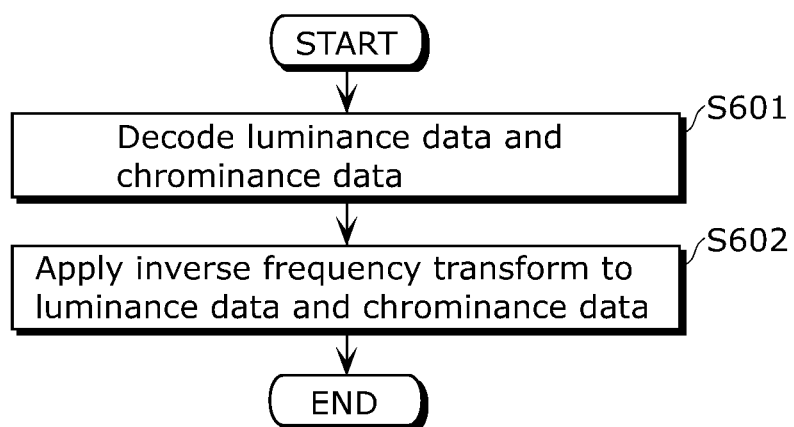
FIG. 16B is a flow chart illustrating the decoding operation according to the fifth embodiment.

FIG. 16B is a flowchart which illustrates the operations of the image decoding apparatus 600 shown in FIG. 16A.

First, the decoder 601 obtains a bitstream and decodes the luminance data and the chrominance data (S601). This bitstream is a bitstream of combined (per predetermined block), frequency transformed, and coded luminance data and chrominance data of the plurality of transform units in a coding unit. Moreover, the coding unit includes a plurality of predetermined blocks. Each of the predetermined blocks corresponds to one or more transform units.

Next, the inverse frequency transform unit 602 applies an inverse frequency transform to the decoded luminance data and the decoded chrominance data (S602).

With this, the memory or register for buffering the data of the plurality of transform units can be reduced. That is, am image is efficiently decoded.

It is to be noted that, for example, each of the predetermined blocks may correspond to a transform unit. Moreover, for example, each of the predetermined blocks may correspond to a plurality of transform units in a block of a predetermined size, or to a transform unit of a size larger than or equal to the predetermined size. The predetermined size may be two times or four times the size of a predetermined smallest size of the transform unit. The predetermined size may be changed based on the image format.

Moreover, for example, in the bitstream, in each of the predetermined blocks, the luminance data may be arranged in succession and grouped together, and the chrominance data may be arranged in succession and grouped together. Moreover, for example, in the bitstream, all chrominance data from a plurality of transform units in a predetermined block may be arranged after all luminance data from a plurality of transform units in a predetermined block. Moreover, for example, in the bitstream, the luminance data and the chrominance data of a second predetermined block may be arranged after the luminance data and the chrominance data of a first predetermined block.

Moreover, for example, the frequency transform unit 501 may apply a frequency transform to the luminance data and the chrominance data on a per transform unit basis, and the inverse frequency transform unit 602 may apply an inverse frequency transform to the luminance data and the chrominance data on a per transform unit basis. Moreover, for example, when the number of pixels in the chrominance data is fewer than the number of pixels in the luminance data, the frequency transform unit 501 may apply a frequency transform to the chrominance data on a per predetermined block basis, and the inverse frequency transform unit 602 may apply an inverse frequency transform to the chrominance data on a per predetermined block basis.

Moreover, for example, the frequency transform unit 501 may combine the chrominance data from a plurality of transform units in a block that is smaller than or equal to a predetermined size, and may apply a frequency transform to the combined chrominance data at once. The frequency transform unit 501 may perform these kinds of processes when the size of the transform unit is the predetermined smallest size and the number of pixels in the chrominance data in the transform unit is fewer than the number of pixels in the luminance data in the transform unit. The image coding apparatus 500 may include a combining unit which combines the chrominance data from a plurality of transform units.

Moreover, for example, the inverse frequency transform unit 602 may, at once, apply an inverse frequency transform to the chrominance data from a plurality of transform units in a block that is smaller than or equal to a predetermined size. The inverse frequency transform unit 602 may perform this kind of process when the size of the transform unit is the predetermined smallest size and the number of pixels in the chrominance data in the transform unit is fewer than the number of pixels in the luminance data in the transform unit. The image decoding apparatus 600 may include a partitioning unit which partitions the chrominance data.

Moreover, for example, the image coding and decoding apparatus may include the image coding apparatus 500 and the image decoding apparatus 600. Moreover, the structural elements described in other embodiments may be added to the image coding apparatus 500 or the image decoding apparatus 600.

In each of the foregoing embodiments, each of the function blocks can usually be realized by means of MPU or memory, for example. Moreover, processing for each of the function blocks can usually be realized by means of software (program) stored on a storage medium such as ROM. The software may be distributed via downloading, or distributed on a storage medium such as a CD-ROM. It is to be noted that each function block can also be realized by means of hardware (dedicated circuit).

Moreover, the processing described in each of the embodiments may be realized by means of integrated processing using a single apparatus (system), or realized by means of decentralized processing using a plurality of apparatuses. Moreover, the computer which executes the foregoing program may be a single computer or a plurality of computers. In other words, integrated processing or decentralized processing may be performed.

The present disclosure is not limited to the foregoing embodiments. It goes without saying that various types of modifications are acceptable and are also included scope of the present disclosure. For example, a process executed by a certain processing unit may be executed by a different processing unit. Moreover, the order of execution of the process may be changed, and a plurality of processes may be executed in parallel.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image coding apparatus according to each of the embodiments is a program described below That is, the program causes the computer to execute the image coding method of coding an image on a per coding unit basis that includes: applying a frequency transform to luminance data and chrominance data of transform units in the coding unit including predetermined blocks each corresponding to one or more of the transform units; and coding the luminance data and the chrominance data to which the frequency transform has been applied to generate a bitstream in which the luminance data and the chrominance data are grouped on a per predetermined block basis.

Moreover, the program may cause the computer to execute the image decoding method of decoding an image on a per coding unit basis that includes: decoding luminance data and chrominance data of transform units in the coding unit including predetermined blocks each corresponding to one or more of the transform units upon obtaining a bitstream in which frequency transformed and coded luminance data and chrominance data are grouped on a per predetermined block basis; and applying an inverse frequency transform to the decoded luminance data and the decoded chrominance data.

The herein disclosed subject matter is to be considered descriptive and illustrative only, and the appended Claims are of a scope intended to cover and encompass not only the particular embodiments disclosed, but also equivalent structures, methods, and/or uses.

Embodiment 6

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
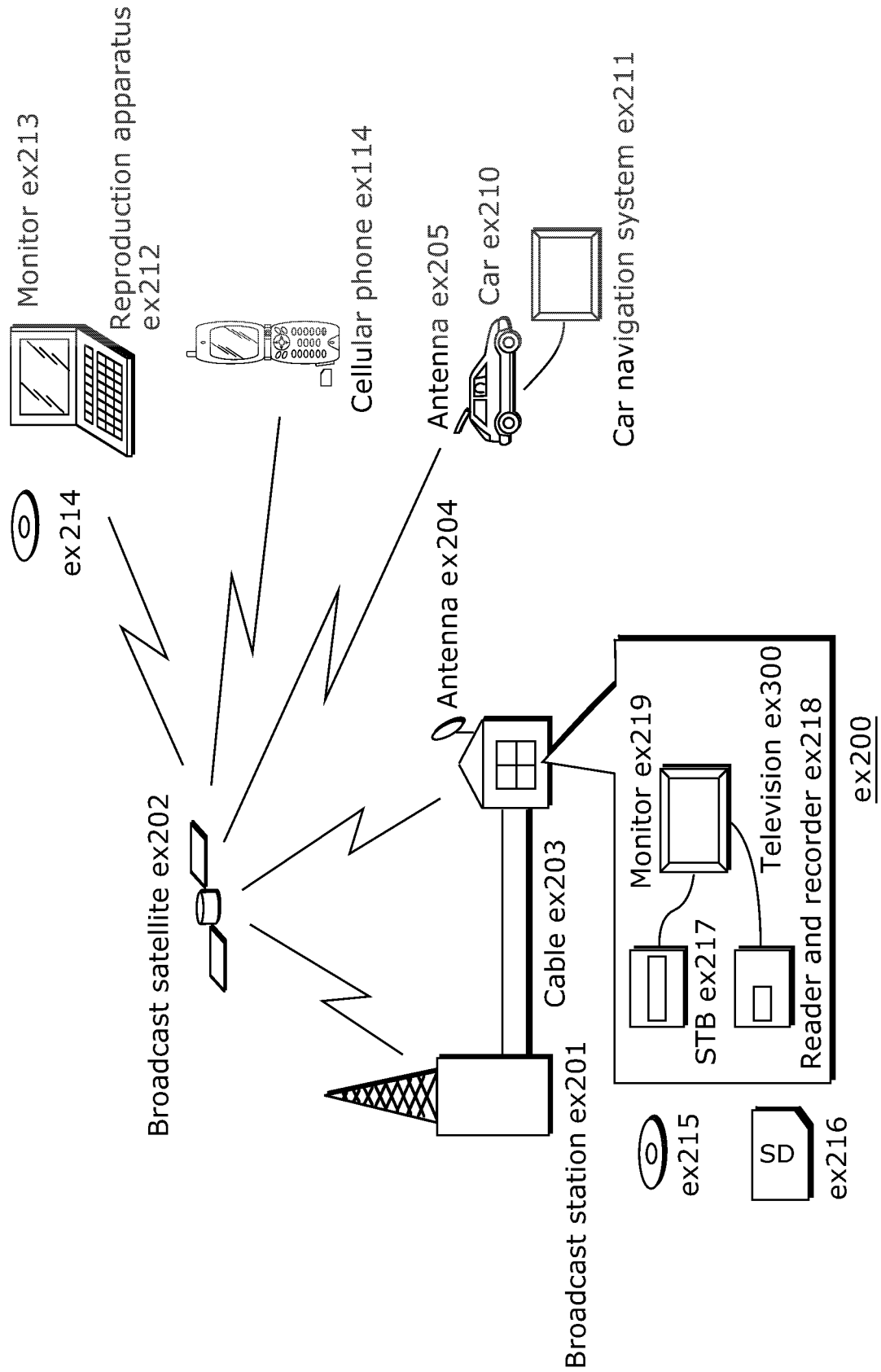
FIG. 18 An overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
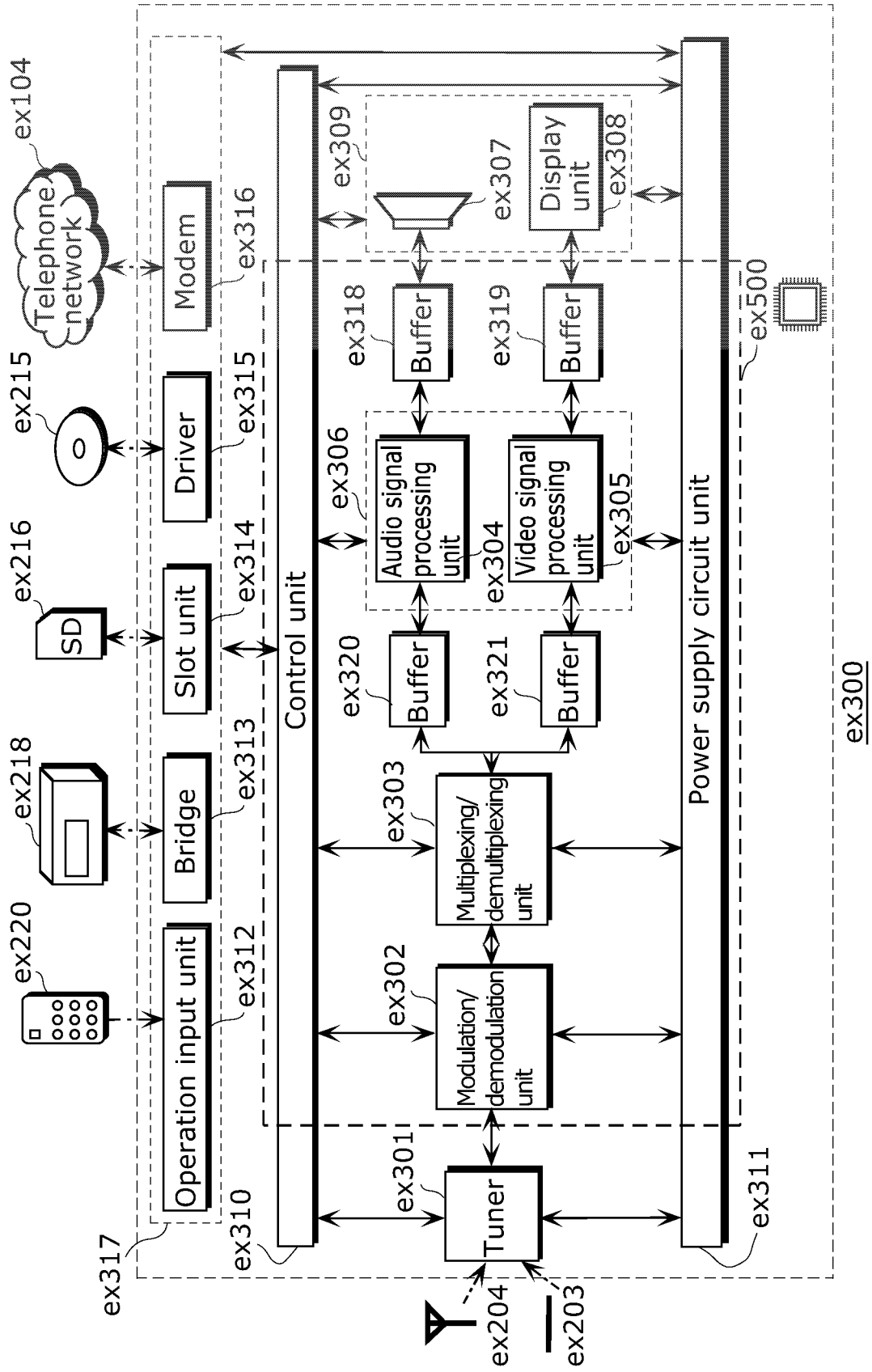
FIG. 19 A block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
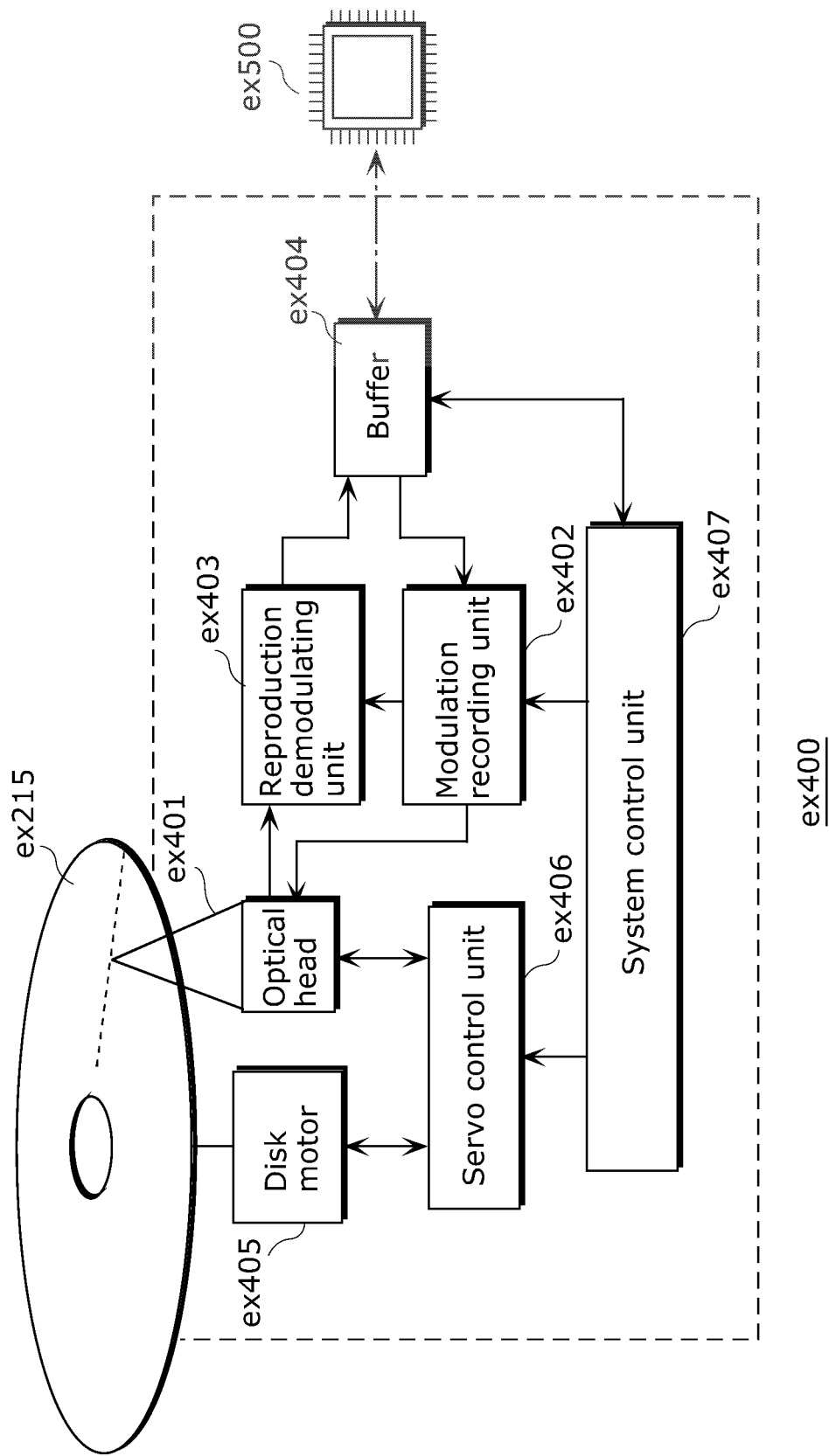
FIG. 20. A block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
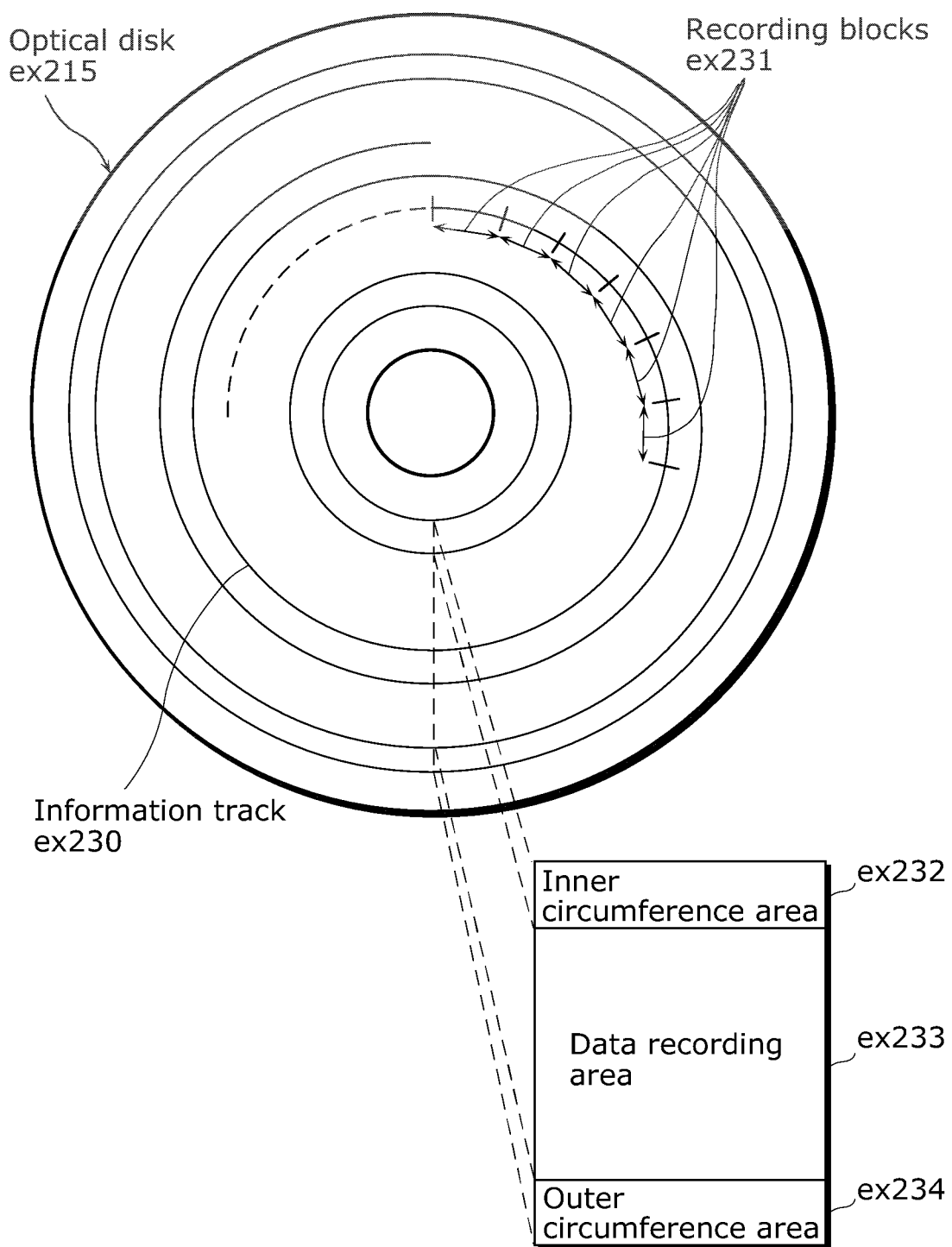
FIG. 21 An example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
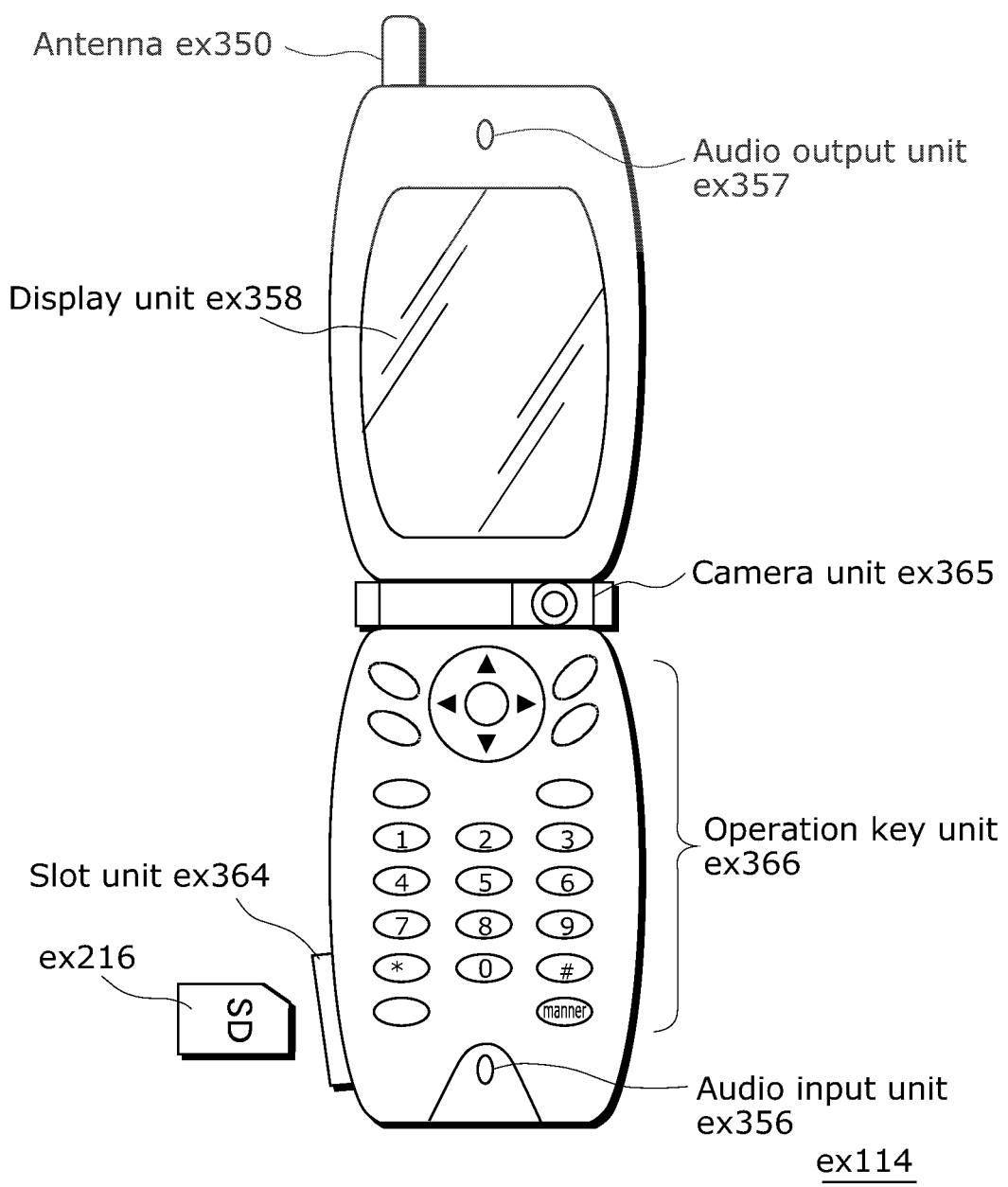
FIG. 22A An example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
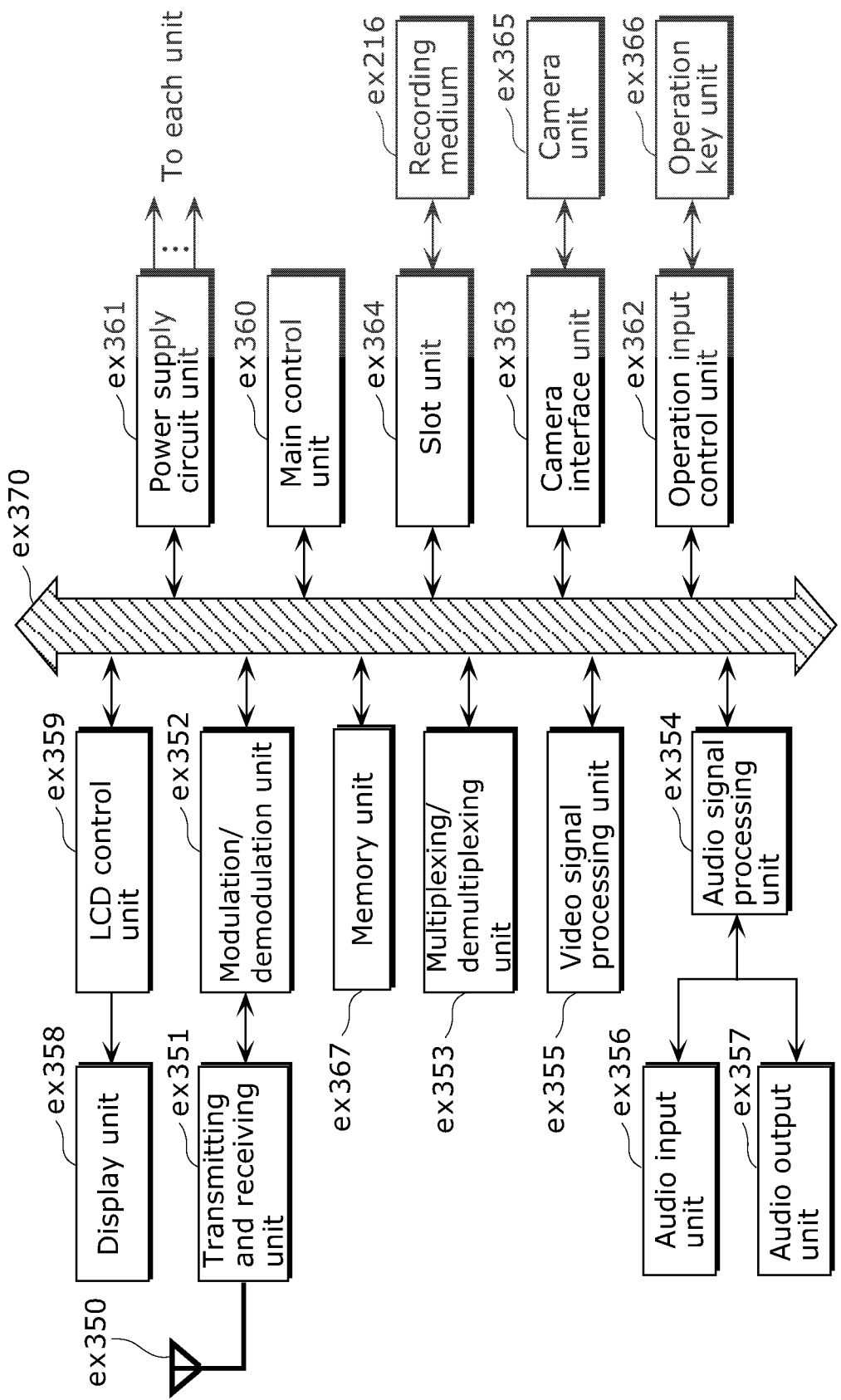
FIG. 22B A block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 7

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
FIG. 23 A structure of multiplexed data.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
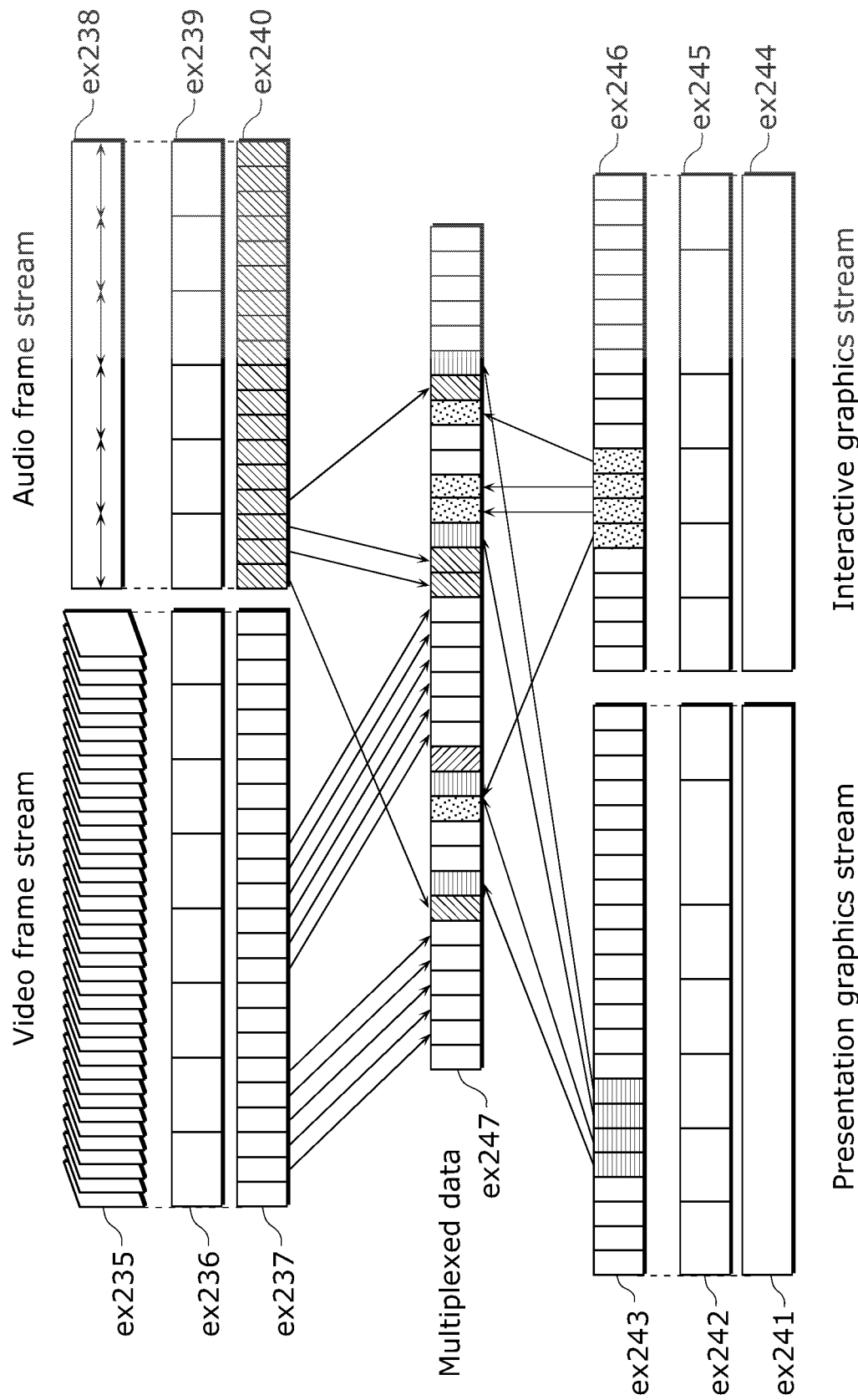
FIG. 24 How to multiplex each stream in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
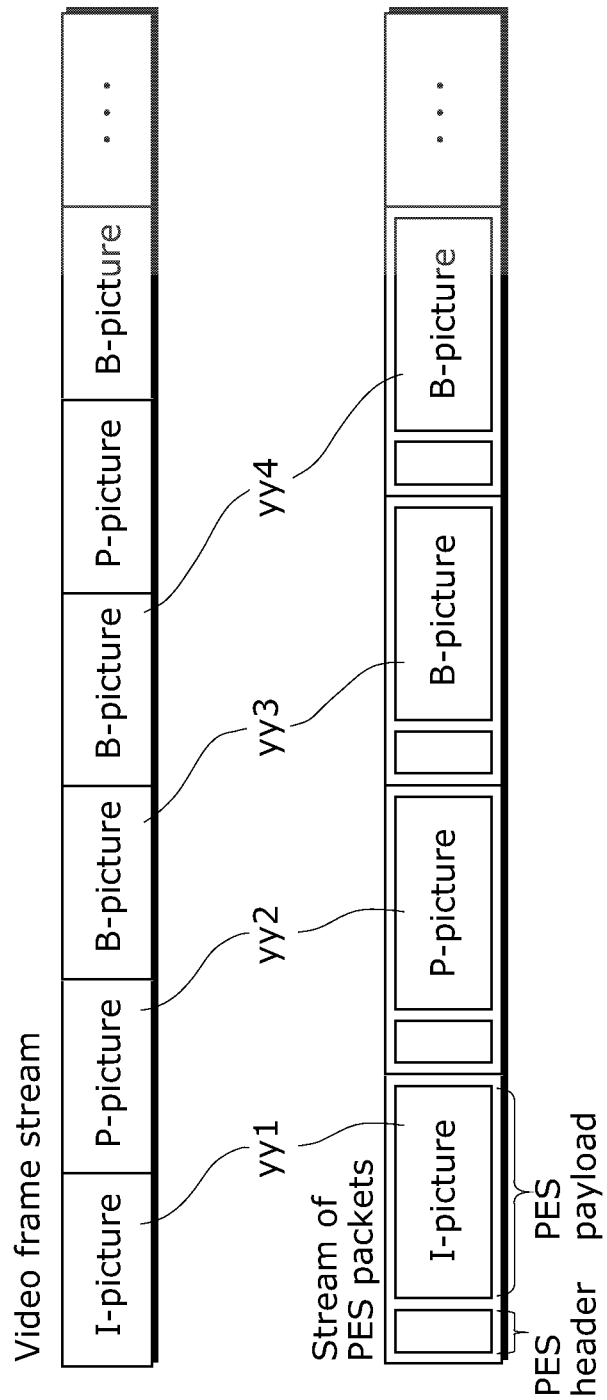
FIG. 25 How to store a video stream in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
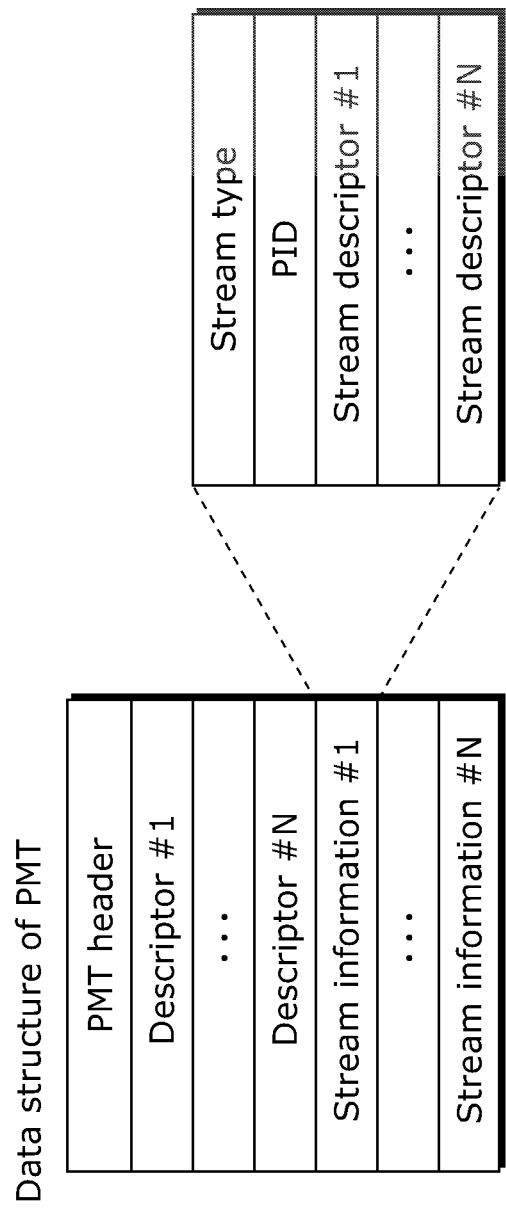
FIG. 27 A data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
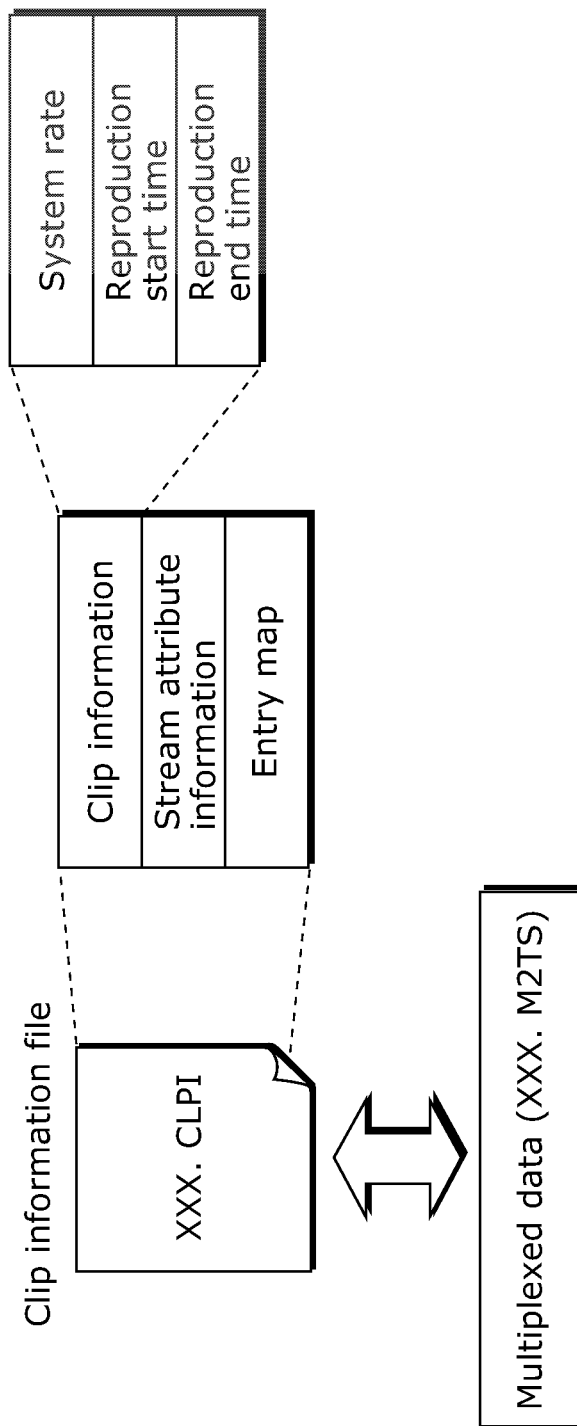
FIG. 28 An internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
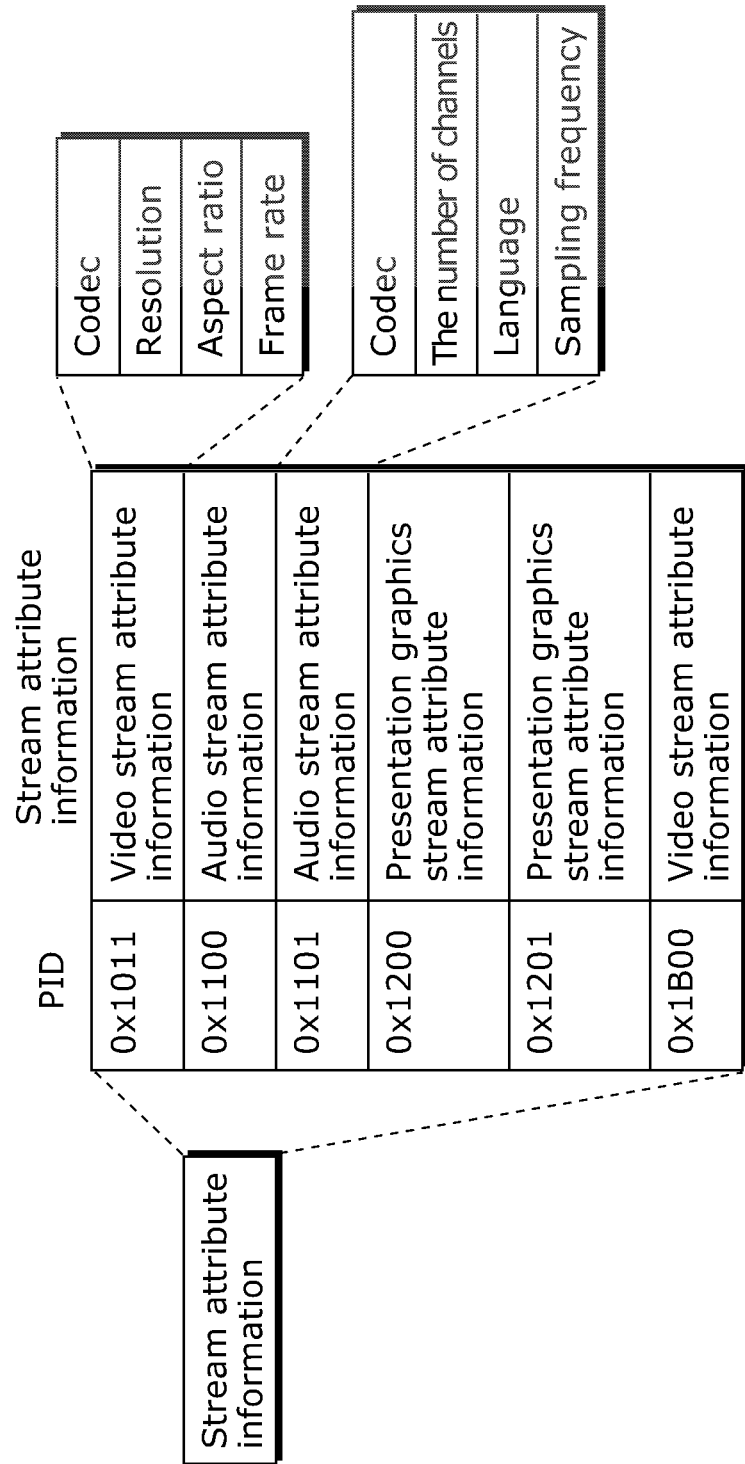
FIG. 29 An internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
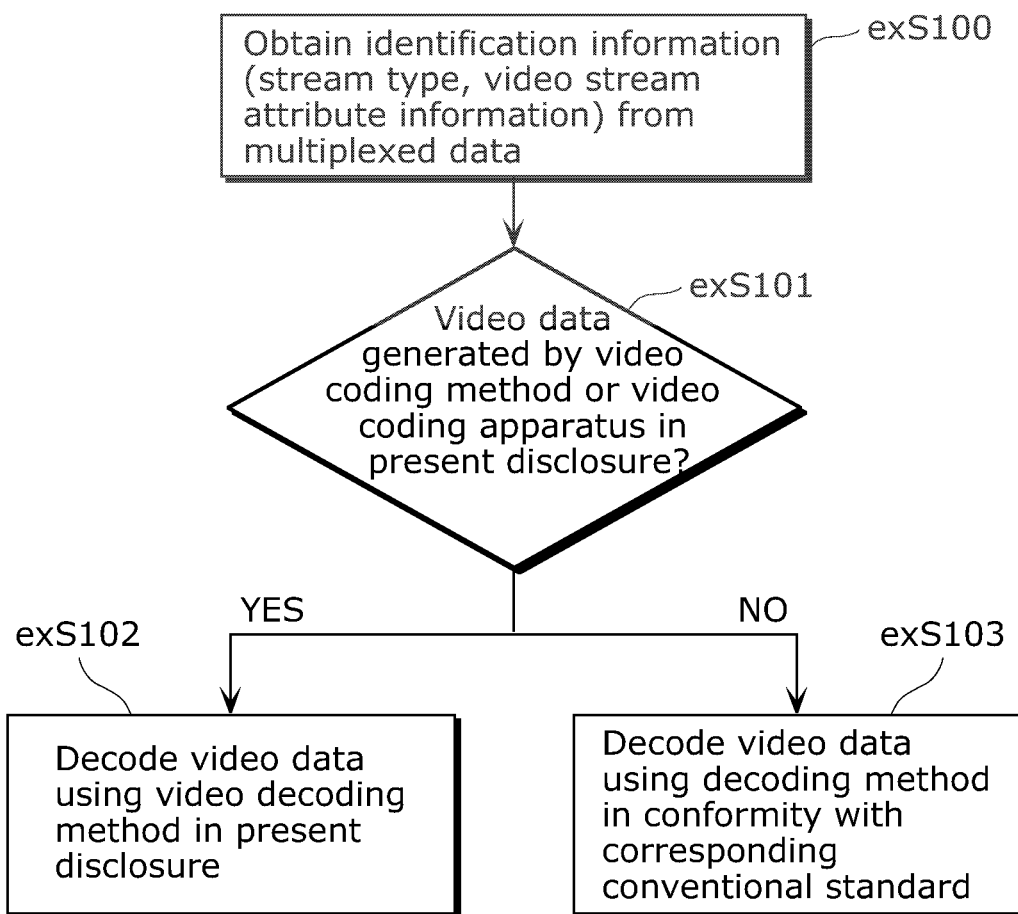
FIG. 30 Steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 8

Figure 31:
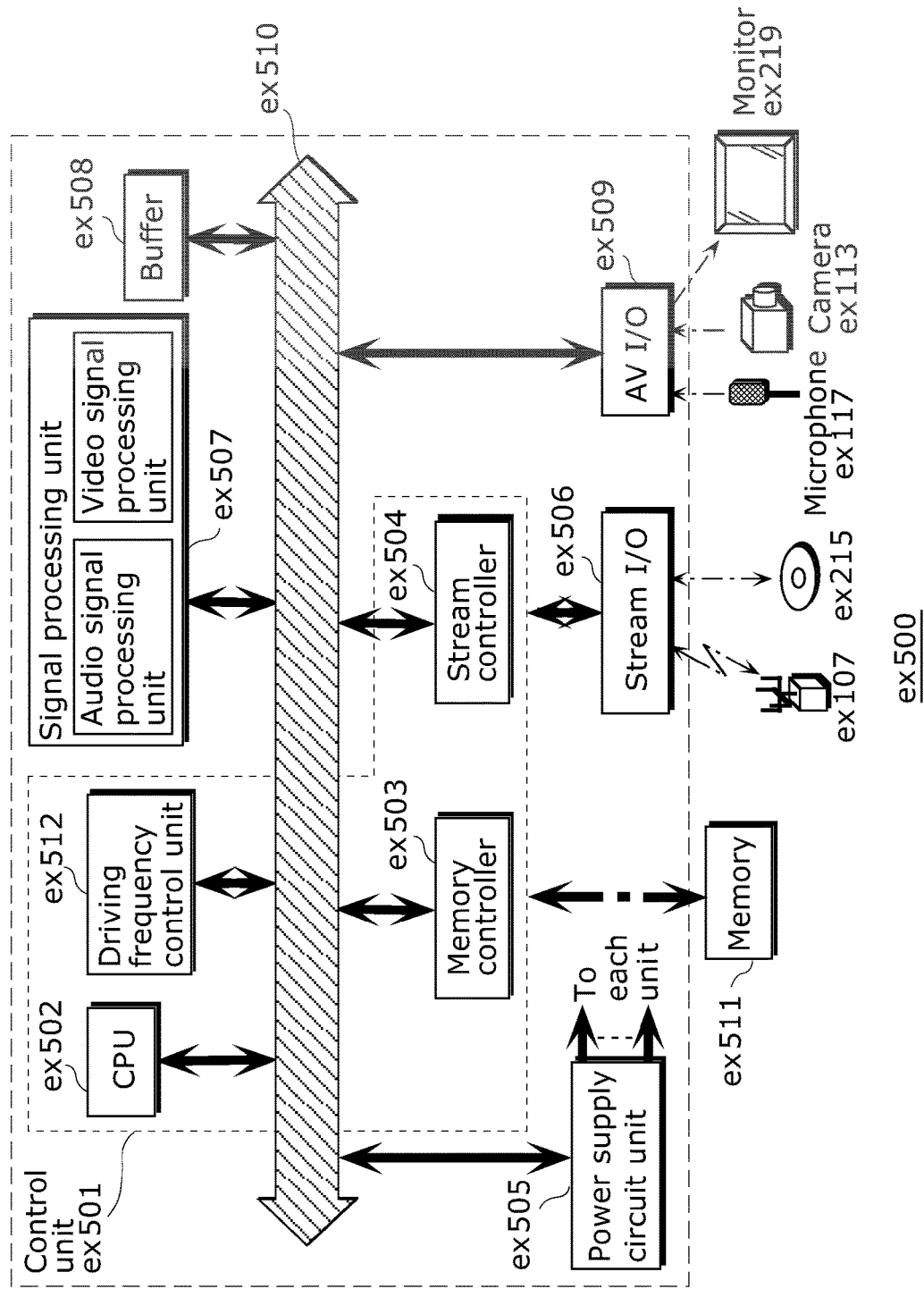
FIG. 31 An example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 9

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
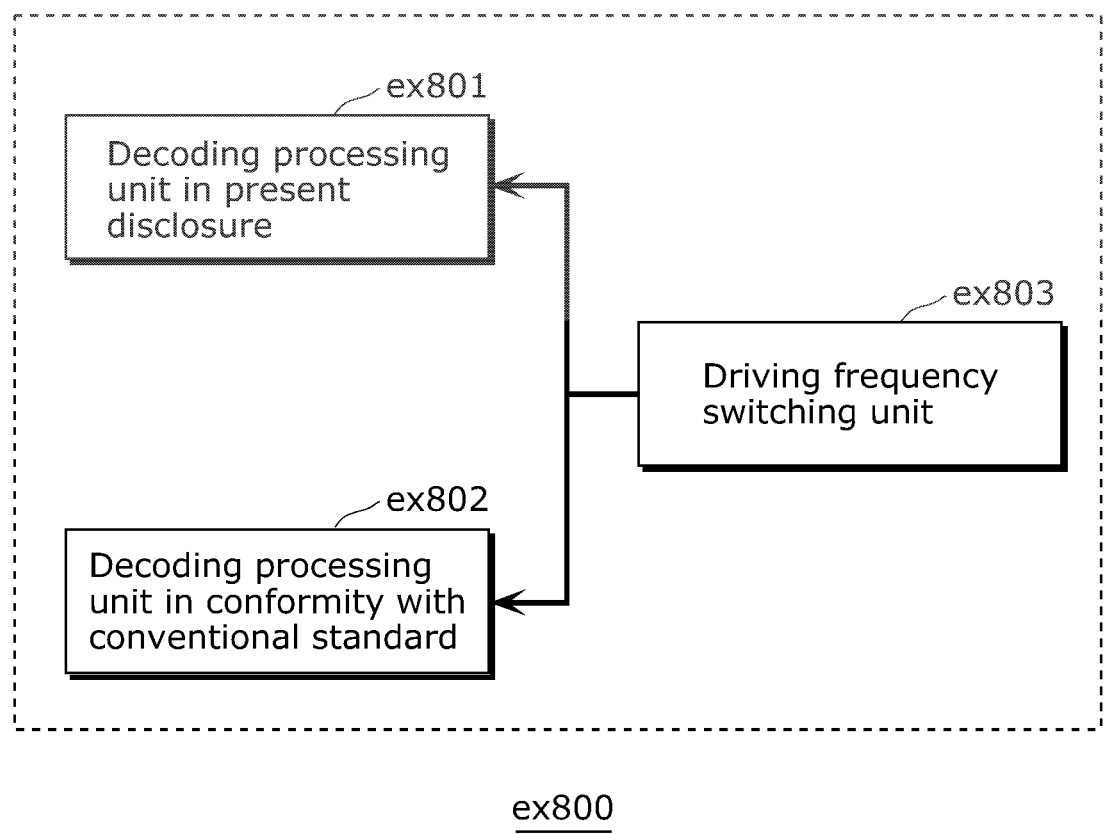
FIG. 32 A configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
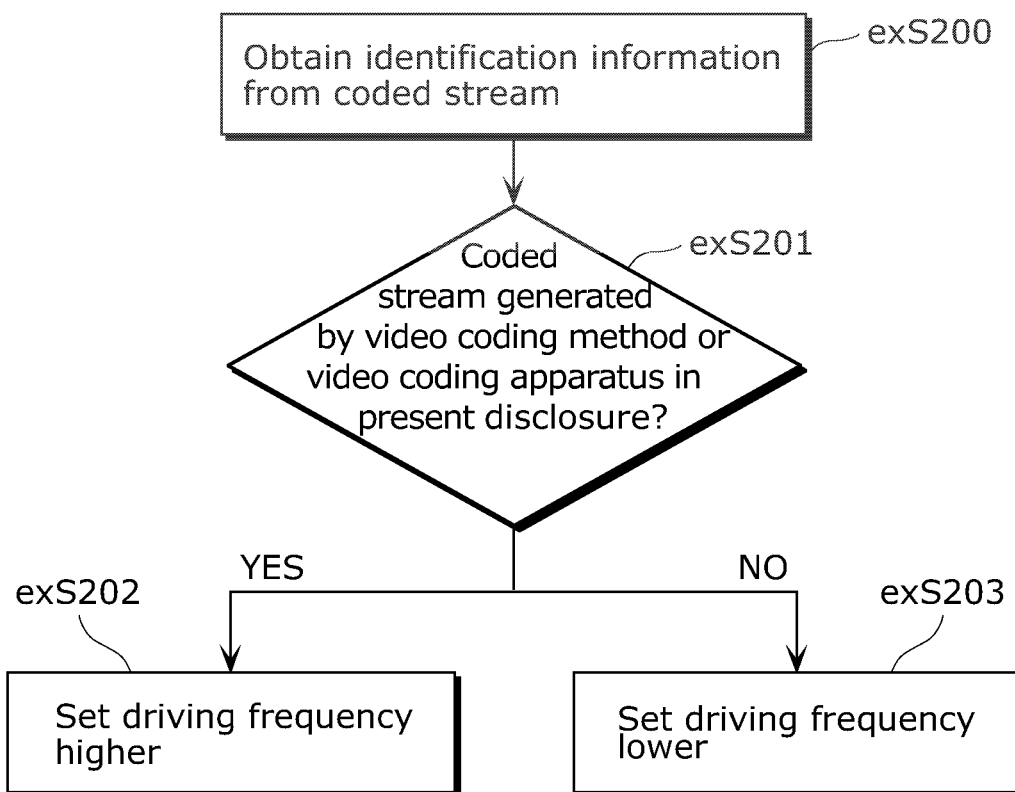
FIG. 33 Steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher. Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method of setting the driving frequency is not limited to the method of setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be increased by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
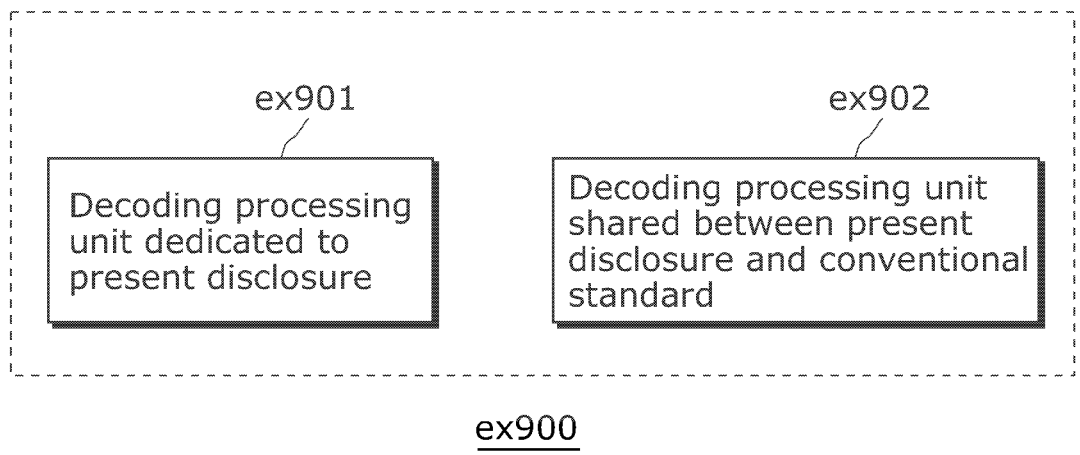
FIG. 35A A diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
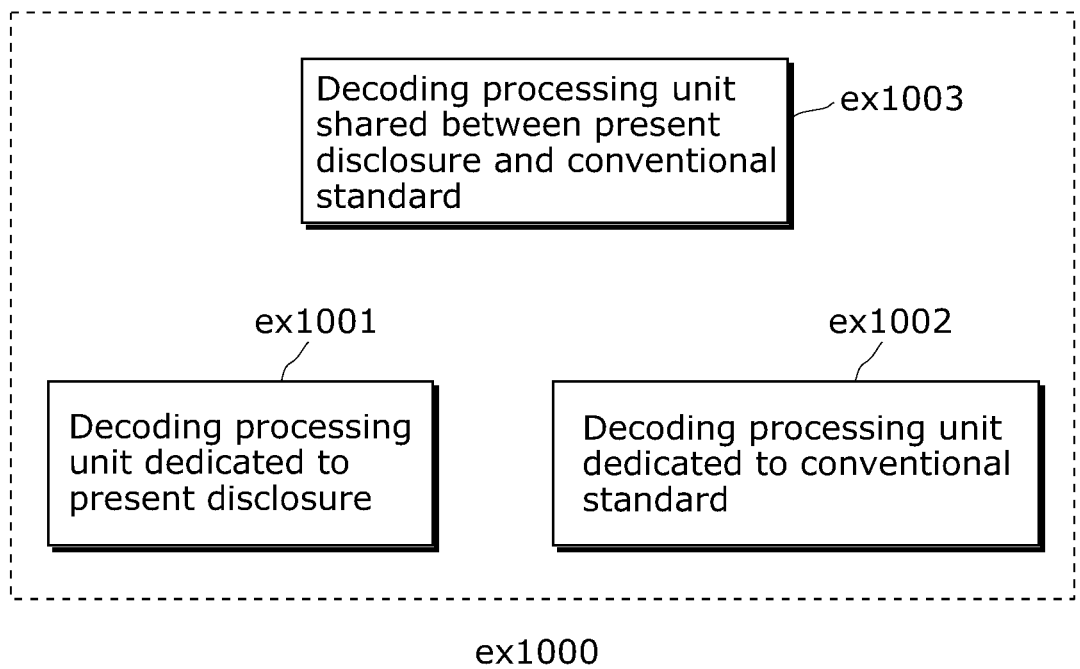
FIG. 35B A diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image coding method and the image decoding method according to the present disclosure are useful in various image coding apparatuses and image decoding apparatuses such as video cameras, cellular phones with cameras, DVD recorders, and televisions, for example.

The invention claimed is:

1. An integrated circuit for coding an image that includes coding units, each of the coding units including a plurality of transform units, the integrated circuit executes operations comprising:
    performing transformation on luminance data and chrominance data of each of the plurality of transform units;
    arranging, for each of the plurality of transform units, transformed luminance data and transformed chrominance data into a set; and
    coding, into a bitstream on a per coding unit basis, the sets arranged for the plurality of transform units, the sets being coded into the bitstream in order,
    wherein the coding units include a coding unit having a first transform unit and a second transform unit,
    wherein, in the coding of the coding unit having the first transform unit and the second transform unit, the set of the transformed luminance data and the transformed chrominance data arranged for the first transform unit is coded into the bitstream before the set of the transformed luminance data and the transformed chrominance data arranged for the second transform unit is coded into the bitstream,
    wherein the coding units are included in a slice of the image,
    wherein each of the coding units corresponds to a square region included in the slice,
    wherein the performing transformation on the luminance data and the chrominance data of each of the plurality of transform units includes:
        determining whether or not a size of a transform unit included in a coding unit is greater than or equal to a predetermined size; and
        combining chrominance data of transform units included in the coding unit and performing transformation on the combined chrominance data, when the transform unit is smaller than the predetermined size, and performing transformation on the chrominance data without performing the combining, when the transform unit is greater than or equal to the predetermined size, and
    wherein, for one of the transform units included in the coding unit, the transformed luminance data is arranged with the transformed combined chrominance data into the set, when the transform unit is smaller than the predetermined size.

* * * * *